United States Patent
Hayashi et al.

(10) Patent No.: US 11,780,232 B2
(45) Date of Patent: Oct. 10, 2023

(54) IMAGE RECORDING APPARATUS COMPRISING LIQUID SUPPLYING DEVICE HAVING TANK AND CARTRIDGE

(71) Applicant: BROTHER KOGYO KABUSHIKI KAISHA, Nagoya (JP)

(72) Inventors: Masahiro Hayashi, Nagoya (JP); Yoshinori Osakabe, Seto (JP); Akinari Ishibe, Kazaki (JP); Hiroaki Takahashi, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/173,894

(22) Filed: Feb. 24, 2023

(65) Prior Publication Data

US 2023/0264479 A1 Aug. 24, 2023

Related U.S. Application Data

(63) Continuation of application No. 17/243,955, filed on Apr. 29, 2021, now Pat. No. 11,597,208, which is a
(Continued)

(30) Foreign Application Priority Data

Feb. 28, 2017 (JP) .................................. 2017-037762

(51) Int. Cl.
*B41J 2/175* (2006.01)
*C09D 11/40* (2014.01)
(Continued)

(52) U.S. Cl.
CPC ....... *B41J 2/17513* (2013.01); *B41J 2/14274* (2013.01); *B41J 2/1752* (2013.01);
(Continued)

(58) Field of Classification Search
CPC ................ B41J 2/17513; B41J 2/14274; B41J 2/17509; B41J 2/1752; B41J 2/17523;
(Continued)

(56) References Cited

U.S. PATENT DOCUMENTS 6,022,102 A 2/2000 Ikkatai et al.
7,234,800 B2 * 6/2007 Watanabe ............ B41J 2/17509
347/85

(Continued)

FOREIGN PATENT DOCUMENTS

JP 2002-292905 A 10/2002
JP 2005-161635 A 6/2005
(Continued)

OTHER PUBLICATIONS

Office Action issued in corresponding Japanese Patent Application No. 2017-037762, dated Dec. 22, 2020.

*Primary Examiner* — Yaovi M Ameh
(74) *Attorney, Agent, or Firm* — Merchant & Gould P.C.

(57) ABSTRACT

According to one aspect, the disclosure provides an image recording apparatus including a liquid supplying device. The liquid supplying device includes a tank, a cartridge, an atmospheric communication portion, and a recording portion. The tank has a second storage chamber configured to store liquid, a liquid passage in communication with the second storage chamber, and a gas passage in communication with the second storage chamber. The atmospheric communication portion includes a buffer tank defining a buffer chamber configured to store gas, a single communication flow passage allowing the buffer chamber to communicate with the second storage chamber, and an air communication passage allowing the buffer chamber to communicate with an atmosphere. When the cartridge is attached to the tank, the buffer chamber is positioned below
(Continued)

the first storage chamber and the second storage chamber is positioned below the buffer chamber.

16 Claims, 12 Drawing Sheets

Related U.S. Application Data continuation of application No. 16/437,404, filed on Jun. 11, 2019, now Pat. No. 10,994,546, which is a continuation of application No. 15/904,649, filed on Feb. 26, 2018, now Pat. No. 10,322,586.

(51) Int. Cl.
  *B41J 2/14* (2006.01)
  *B41J 29/13* (2006.01)

(52) U.S. Cl.
  CPC ....... *B41J 2/17509* (2013.01); *B41J 2/17523* (2013.01); *B41J 2/17533* (2013.01); *B41J 2/17553* (2013.01); *B41J 29/13* (2013.01); *C09D 11/40* (2013.01)

(58) Field of Classification Search
  CPC .... B41J 2/17533; B41J 2/17553; B41J 29/13; C09D 11/40
  See application file for complete search history.

(56) References Cited

U.S. PATENT DOCUMENTS

| | | |
|---|---|---|
| 7,954,933 B2 | 6/2011 | Fung et al. |
| 9,738,087 B2 | 8/2017 | Kato et al. |
| 10,350,897 B2 | 7/2019 | Hayashi et al. |
| 10,618,295 B2 | 4/2020 | Hayashi et al. |
| 10,792,926 B2 | 10/2020 | Hayashi et al. |
| 2002/0109758 A1 | 8/2002 | Kono |
| 2002/0109761 A1* | 8/2002 | Shimizu ............... B41J 2/17553 347/50 |
| 2002/0118262 A1 | 8/2002 | Seino et al. |
| 2003/0043216 A1 | 3/2003 | Usui et al. |
| 2005/0117003 A1 | 6/2005 | Kyogoku et al. |
| 2006/0164478 A1 | 7/2006 | Fukazawa |
| 2010/0231662 A1 | 9/2010 | Ara et al. |
| 2011/0069126 A1* | 3/2011 | Feng .................... B41J 2/17556 347/87 |
| 2016/0297205 A1 | 10/2016 | Takahashi |

FOREIGN PATENT DOCUMENTS

| | | | | |
|---|---|---|---|---|
| JP | 2005-161640 A | 6/2005 | | |
| JP | 2006-205528 A | 8/2006 | | |
| JP | 2007-313829 A | 12/2007 | | |
| JP | 2008-230248 A | 10/2008 | | |
| JP | 2010-137510 A | 6/2010 | | |
| JP | 2010137510 A | * | 6/2010 | .............. B41J 2/175 |
| JP | 4934338 B2 | 5/2012 | | |
| JP | 2014-184566 A | 10/2014 | | |
| WO | 2015/016119 A1 | 2/2015 | | |

* cited by examiner

IMAGE RECORDING APPARATUS COMPRISING LIQUID SUPPLYING DEVICE HAVING TANK AND CARTRIDGE

CROSS REFERENCE TO RELATED APPLICATION

This application is a continuation of U.S. patent application Ser. No. 17/243,955, filed Apr. 29, 2021, which is a continuation of U.S. patent application Ser. No. 16/437,404, filed Jun. 11, 2019, now U.S. Pat. No. 10,994,546, which is a continuation of U.S. patent application Ser. No. 15/904,649, filed Feb. 26, 2018, now U.S. Pat. No. 10,322,586, which further claims priority from Japanese Patent Application No. 2017-037762 filed Feb. 28, 2017. The entire content of these applications is incorporated herein by reference.

TECHNICAL FIELD

The present disclosure relates to an image recording apparatus including a liquid supplying device having a tank and a cartridge.

BACKGROUND

Conventionally, there has been known an image recording apparatus provided with a cartridge in which ink is stored, a sub tank connected to a recording head, and a liquid flow passage and a gas flow passage which connects the cartridge and the sub tank. The cartridge is disposed vertically above the sub tank. The liquid flow passage and the gas flow passage connect the cartridge and the sub tank in the vertical direction. The liquid flow passage and the gas flow passage are opened to the lower surface of the cartridge and the upper surface of the sub tank, respectively. Further, an air introduction opening is provided on an upper wall of the sub tank such that the air introduction opening penetrates the upper wall, and gas is supplied to the gas flow passage from the air introduction opening through the inside of the sub tank.

SUMMARY

In the sub tank, the liquid flow passage extends below the gas flow passage, and the opening position of the gas flow passage is higher than the opening position of the liquid flow passage. When the cartridge is connected in a state in which there is no ink in the sub tank, such as when replacing the cartridge, the ink in the cartridge naturally drops via the liquid flow passage and is introduced into the sub tank. At this time, the air in the sub tank having the same volume as the amount of introduced ink is introduced into the cartridge from the air introduction opening via the gas flow passage (gas-liquid substitution). The gas-liquid substitution is performed until the opening of the gas flow passage is blocked, and the ink is stored in the sub tank.

When ink is ejected from the recording head at the time of executing the recording operation, the ink in the sub tank decreases and the liquid level of the ink in the sub tank decreases. As a result, since the opening of the gas flow passage is opened, ink is supplied from the cartridge into the sub tank. When the level of ink in the sub tank rises due to the introduction of the ink and the opening of the gas flow passage is blocked, the supply of ink from the cartridge is stopped. Ink is replenished from the cartridge to the sub tank so as to compensate for consumption of ink in the recording head, and the height of the liquid level of the ink in the sub tank is kept at the opening position of the gas flow passage. Therefore, by exchanging the cartridge in which the ink is empty with the cartridge filled with ink while the sub tank is disposed in a printer, the printer can be continuously used.

In the liquid supplying device, the liquid flow passage is formed by an inner surface of a cylinder, which is a cylindrical surface. The capillary pressure in liquid exerted on the cylindrical surface is uniform in its circumferential direction. Since the capillary pressure is unbiased in the circumferential direction, the meniscus of liquid, which is curvature of the liquid surface, is hardly broken. If the meniscus is maintained, the liquid cannot flow in the liquid flow passage. Accordingly, the gas-liquid substitution cannot be carried out even when ink is consumed by the recording head to reduce the ink amount in the sub tank, and the sub tank therefore cannot be replenished with ink.

The disclosure has been made in view of the above problems, and an object thereof is to provide a liquid supplying device in which the gas-liquid substitution can be well performed.

According to one aspect, the disclosure provides an image recording apparatus including a liquid supplying device. The liquid supplying device includes a tank; a cartridge configured to be attachable to the tank, and having a first storage chamber; an atmospheric communication portion; and a recording portion configured to eject liquid supplied from the tank. The tank has a second storage chamber configured to store the liquid, a liquid passage in communication with the second storage chamber, and a gas passage in communication with the second storage chamber. The atmospheric communication portion includes a buffer tank defining a buffer chamber configured to store gas, a single communication flow passage allowing the buffer chamber to communicate with the second storage chamber, and an air communication passage allowing the buffer chamber to communicate with an atmosphere. In an attachment state where the cartridge is attached to the tank such that the first storage chamber is in communication with both of the liquid passage and the gas passage, the buffer chamber is positioned below the first storage chamber and the second storage chamber is positioned below the buffer chamber.

BRIEF DESCRIPTION OF THE DRAWINGS

The particular features and advantages of the disclosure will become apparent from the following description taken in connection with the accompanying drawings, in which.

DETAILED DESCRIPTION

Figure 1A:
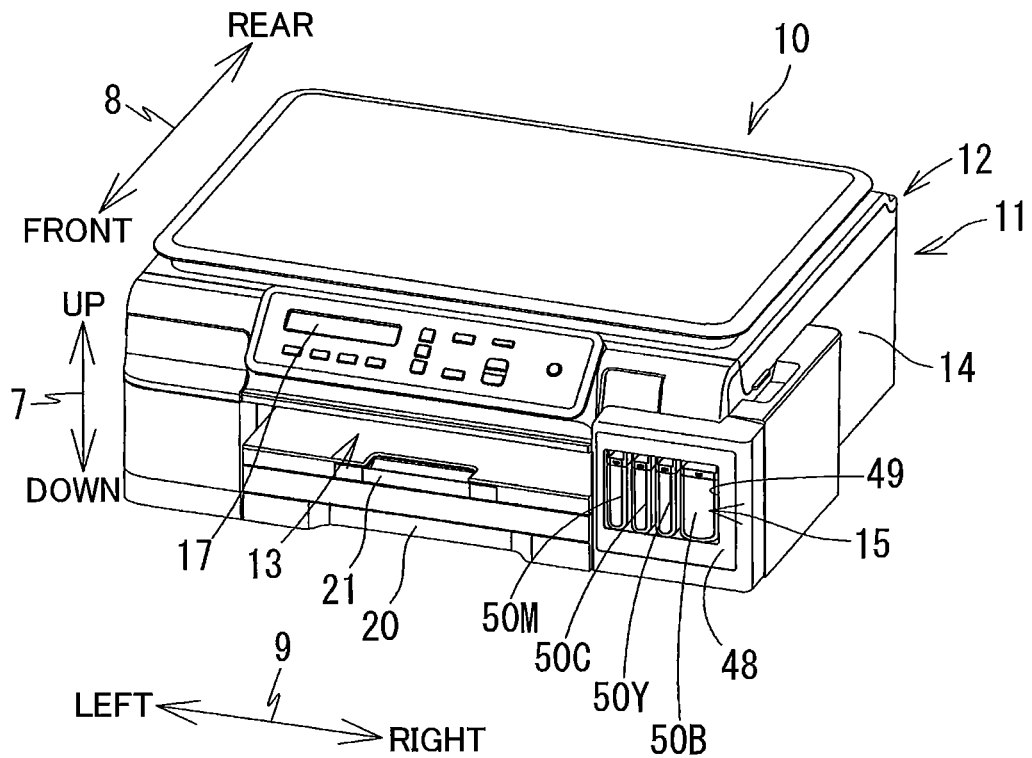
FIG. 1A is a perspective view of a multifunction machine according to an embodiment in a state where a cover is at a close position.

Hereinafter, embodiments of the disclosure will be described. It is noted that the embodiments described below are merely examples of the disclosure and the embodiments of the disclosure can be appropriately modified without changing the scope of the disclosure. Further, on the basis of the posture (the posture of FIG. 1, and referred to as "use posture" occasionally) in which a multifunction machine 10 and an ink cartridge 50 attached to the multifunction machine 10 are installed on a horizontal plane so as to be usable, an up-down direction 7 is defined, and a front-rear direction 8 is defined by a surface provided with an opening 13 of the multifunction machine 10 as the front surface, and a left-right direction 9 is defined when the multifunction machine 10 is viewed from the front side. In the embodiments, at the use posture, the up-down direction 7 corresponds to the vertical direction, and the front-rear direction 8 and the left-right direction 9 correspond to the horizontal direction.

[Embodiment]

Hereinafter, the multifunction machine 10 and the ink supplying device 15 according to the embodiment will be described.

[Entire configuration of multifunction machine 10]

Figure 1B:
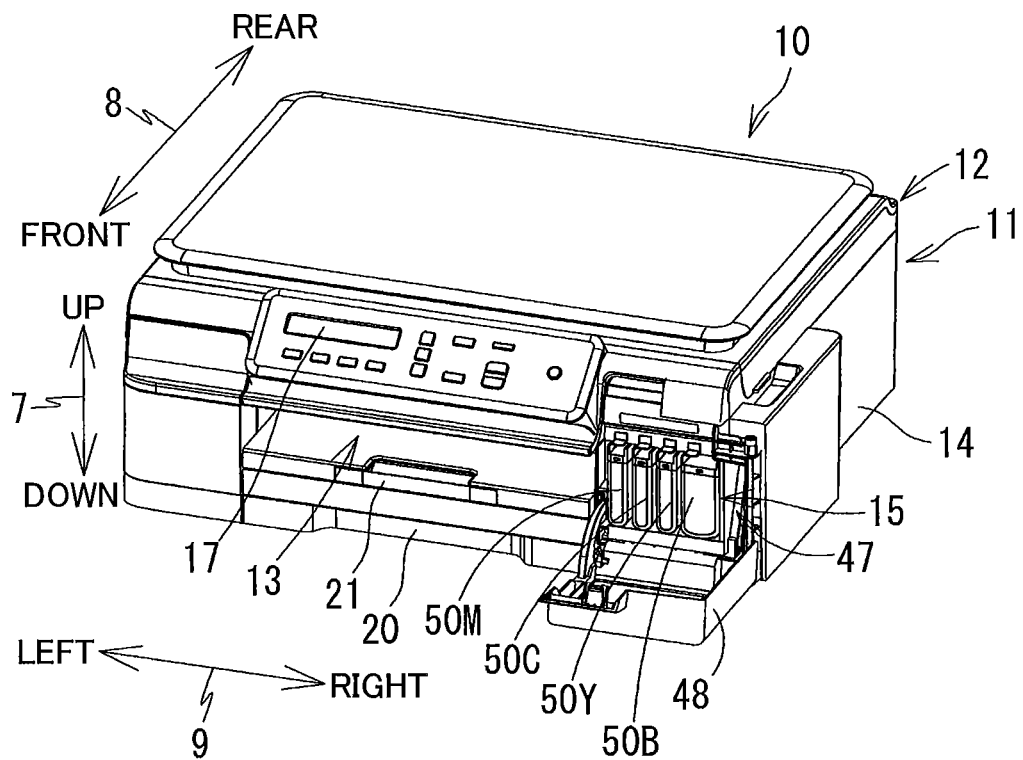
FIG. 1B is a perspective view of the multifunction machine according to the embodiment in a state where the cover is at an open position.

As illustrated in FIGS. 1A and 1B, the multifunction machine 10 (an example of an image recording device) has a substantially rectangular parallelepiped shape. The multifunction machine 10 has a printer unit 11, a scanner unit 12, and an operation panel 17. The printer unit 11 is positioned in a lower part of the multifunction machine 10, and records an image on a sheet 28 (see FIG. 2) in an ink jet recording method. The scanner unit 12 is a device having a scan function and is positioned in an upper part of the printer unit 11. The printer unit 11 is provided with a casing 14 having an opening 13 that is opened forward, and an ink supplying device 15 positioned on a right side of the opening 13 inside the casing 14. The operation panel 17 is positioned in a front part of the scanner unit 12. The operation panel 17 is operated by a user so as to cause the multifunction machine 10 to execute image recording by the printer unit 11 or image reading by the scanner unit 12.

Figure 2:
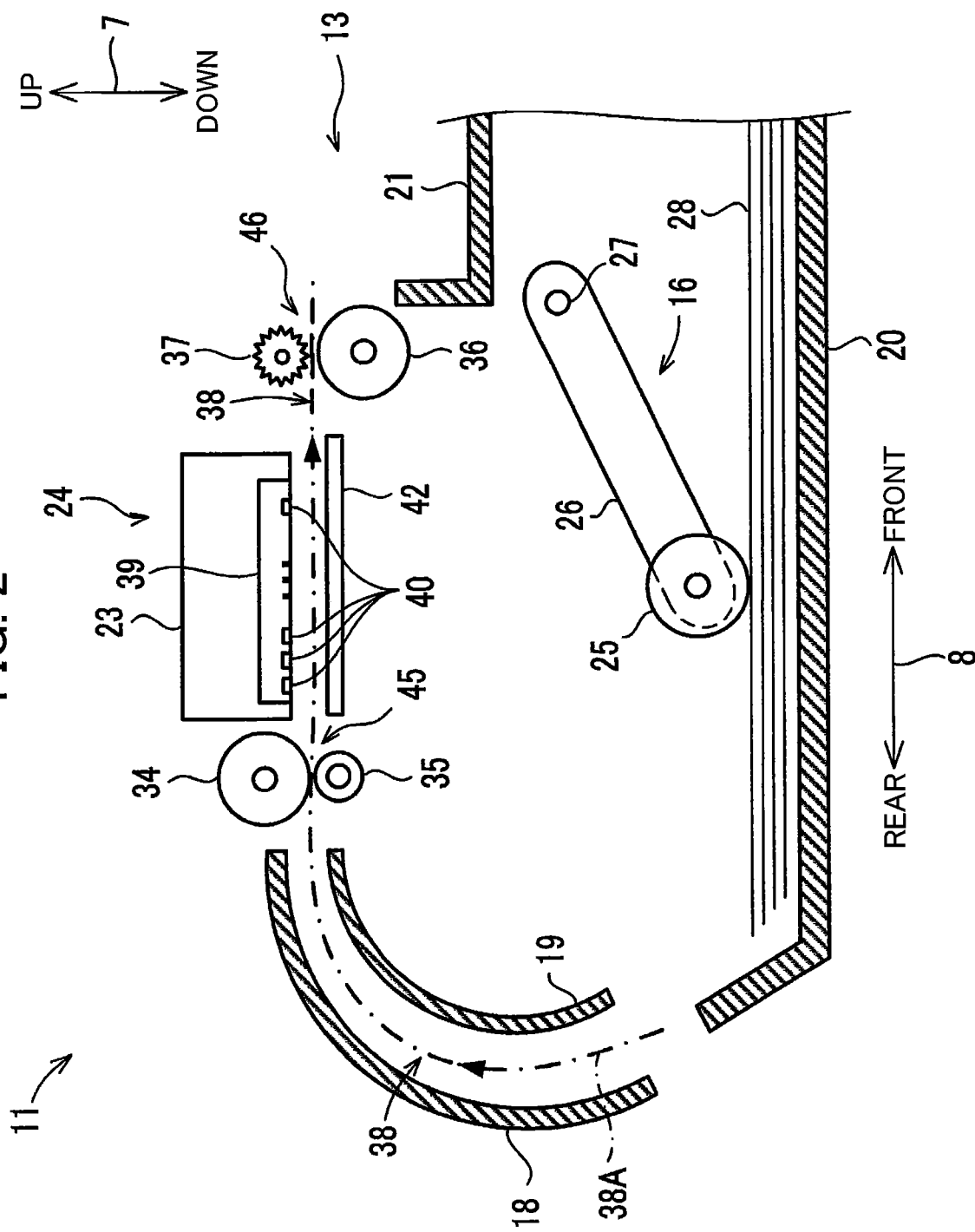
FIG. 2 is a vertical sectional view of a printer according to the embodiment indicating an internal structure of the printer.

As illustrated in FIG. 2, a feeding unit 16, a feeding tray 20, a discharge tray 21, a pair of conveying rollers 45, a recording unit 24, a pair of discharge rollers 46, and a platen 42 are disposed inside the casing 14.

[Feeding tray 20, discharge tray 21]

As illustrated in FIG. 1, the feeding tray 20 can be inserted into and removed from the casing 14 through the opening 13 along the front-rear direction 8. The opening 13 is positioned on the front surface of the multifunction machine 10 and at the central portion in the left-right direction 9. As illustrated in FIG. 2, the feeding tray 20 can support a plurality of stacked sheets 28. The discharge tray 21 is disposed in the upper part of the feeding tray 20 and is inserted and extracted along the front-rear direction 8 together with the feeding tray 20. The discharge tray 21 supports the sheet 28 discharged by the pair of discharge rollers 46.

[Feeding unit 16]

The feeding unit 16 feeds the sheet 28 supported by the feeding tray 20 to a conveying path 38. As illustrated in FIG. 2, the feeding unit 16 is provided with a feeding roller 25, a feeding arm 26, and a shaft 27. The feeding roller 25 is rotatably supported at the distal end of the feeding arm 26. Driving is transmitted to the feeding roller 25 from a feeding motor (not illustrated). The feeding arm 26 is rotatably supported by the shaft 27 that is supported by a frame of the printer unit 11. The feeding arm 26 is pivotally urged toward the feeding tray 20 by its own weight or an elastic force of a spring.

Hereinafter, the rotation of the feeding roller 25, the conveying roller 34, and the discharge roller 36 related to the conveyance of the sheet 28 in a conveying direction 38A for conveying the sheet 28 is indicated as "normal rotation".

[Conveying path 38]

Figure 3:
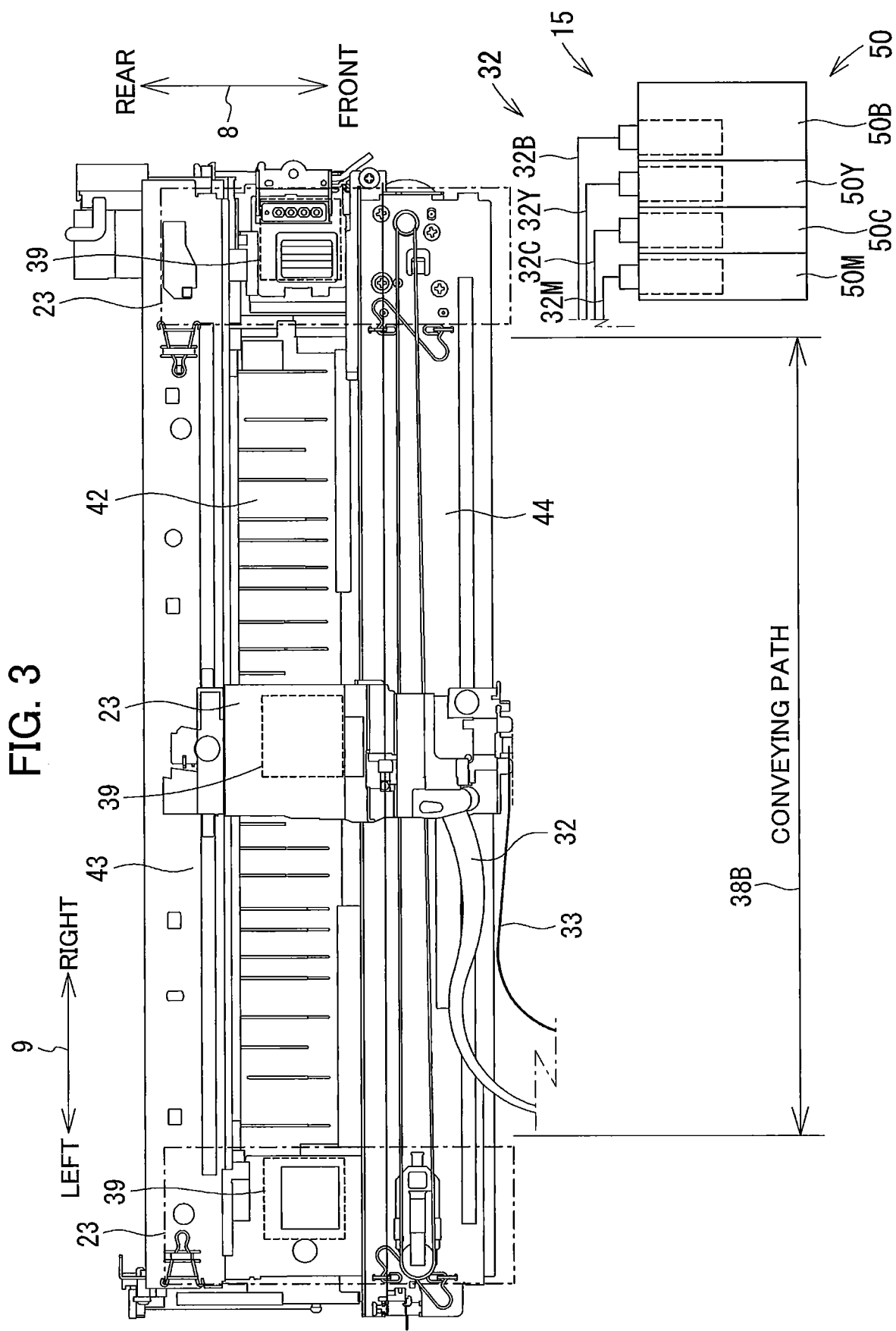
FIG. 3 is a planner view indicating disposition of a carriage and an ink supplying device according to the embodiment.

As illustrated in FIG. 2, the conveying path 38 indicates a space which is partially formed by an outer guide member 18 and an inner guide member 19 facing each other at a predetermined interval inside the printer unit 11. The conveying path 38 is a path extending rearward from the rear end portion of the feeding tray 20. The conveying path 38 is bent forward as making U-turn, while extending upward at the rear portion of the printer unit 11, and reaches the discharge tray 21 via the space between the recording unit 24 and the platen 42. As illustrated in FIGS. 2 and 3, the conveying path 38 between the pair of conveying rollers 45 and the pair of discharge rollers 46 is provided at the substantially center of the multifunction machine 10 in the left-right direction 9, and extends in the front-rear direction 8. The conveying direction 38A of the sheet 28 in the conveying path 38 is indicated by the arrow in FIG. 2.

[Pair of conveying rollers 45]

As illustrated in FIG. 2, the pair of conveying rollers 45 is positioned upstream of the recording unit 24 in the conveying direction 38A. The pair of conveying rollers 45 has a conveying roller 34 and a pinch roller 35 that face each other. The driving is transmitted to the conveying roller 34 from a conveying motor (not illustrated), and the conveying roller 34 rotates in a normal direction or a reverse direction. The pinch roller 35 rotates with the rotation of the conveying roller 34. The sheet 28 is conveyed in the conveying direction 38A, while being nipped between the conveying roller 34 and the pinch roller 35 rotating in the normal direction.

[Pair of discharge rollers 46]

As illustrated in FIG. 2, the pair of discharge rollers 46 is disposed downstream of the recording unit 24 in the conveying direction 38A. The pair of discharge rollers 46 has a discharge roller 36 and a spur 37 facing each other. The driving force generated by a conveying motor (not illustrated) is transmitted to the discharge roller 36 to rotate in the normal direction or the reverse direction. The spur 37 rotates with the rotation of the discharge roller 36. The sheet 28 is conveyed in the conveying direction 38A, while being nipped between the discharge roller 36 and the spur 37 rotating in the normal direction.

[Recording unit 24]

As illustrated in FIG. 2, the recording unit 24 is positioned between the pair of conveying rollers 45 and the pair of discharge rollers 46 in the conveying direction 38A. The recording unit 24 faces the platen 42 in the up-down direction 7 across the conveying path 38. The recording unit 24 is provided with a carriage 23, and a recording head 39 mounted on the carriage 23.

As illustrated in FIG. 3, the carriage 23 is a guide rail is supported by guide rails 43 and 44 each extending in the left-right direction 9. The guide rails 43 and 44 are separated in the front-rear direction 8 and supported by a frame (not illustrated). The carriage 23 is connected to a known belt mechanism provided on the guide rail 44. Driving force generated by a carriage driving motor (not illustrated) is transmitted to the belt mechanism, and the belt mechanism circulates. As the belt mechanism rotates, the carriage 23 reciprocally moves in the left-right direction 9, while being guided by the guide rails 43 and 44. The range of movement of the carriage 23 extends to the right and to the left of the width 38B of the conveying path 38, as indicated by the alternate long and short dashed line of FIG. 3.

The recording head 39 and the four sub tanks 100 provided in the ink supplying device 15 are connected by four ink tubes 32. The recording head 39 is connected to a control board (not illustrated) by a flexible flat cable 33.

The four sub tanks 100 are a magenta sub tank 100M, a cyan sub tank 100C, a yellow sub tank 100Y, and a black sub tank 100B. The magenta sub tank 100M, the cyan sub tank 100C, the yellow sub tank 100Y, and the black sub tank 100B are collectively referred to as sub tanks 100, unless it is particularly necessary to distinguish in this specification.

The four ink tubes 32 include a yellow ink tube 32Y, a cyan ink tube 32C, a magenta ink tube 32M, and a black ink tube 32B. The yellow ink tube 32Y, the cyan ink tube 32C, the magenta ink tube 32M, and the black ink tube 32B are collectively referred to as ink tubes 32 unless it is particularly necessary to distinguish in this specification. The four ink tubes 32 are bundled together.

The flexible flat cable 33 electrically connects the control board, on which the control unit is mounted, and the recording head 39. The flexible flat cable 33 transmits a control signal, which is output from the control unit, to the recording head 39.

As illustrated in FIG. 2, a plurality of nozzles 40 is disposed on the lower surface of the recording head 39. The distal ends of the plurality of nozzles 40 are exposed from the lower surface of the recording head 39. The recording head 39 ejects ink from the nozzle 40 as minute ink droplets. In the course of movement of the carriage 23, the recording head 39 ejects the ink droplets toward the sheet 28 supported by the platen 42. As a result, an image is recorded on the sheet 28. Further, the ink stored in the four sub tanks 100 is consumed.

[Platen 42]

As illustrated in FIGS. 2 and 3, the platen 42 is disposed between the pair of conveying rollers 45 and the pair of discharge rollers 46 in the conveying path 38. The platen 42 is disposed to face the recording unit 24 in the up-down direction 7 across the conveying path 38. The platen 42 supports the sheet 28 conveyed by the pair of conveying rollers 45 from below.

[Cover 48]

As illustrated in FIG. 1B, an opening 47 is formed in the right front part of the casing 14. An ink supplying device 15 is housed in the casing 14, and the front surface of the ink supplying device 15 is exposed from the opening 47. A cover 48 capable of opening and closing the opening 47 is attached to the casing 14. The lower end portion of the cover 48 is supported by the casing 14 so as to be rotatable about an axis extending in the left-right direction 9 below the opening 47. The cover 48 is rotatable between a close position (a position illustrated in FIG. 1A) for closing the opening 47 and an open position (a position illustrated in FIG. 1B) for opening the opening 47.

As illustrated in FIG. 1A, the cover 48 has a light-transmitting portion 49. The light-transmitting portion 49 has translucency so that the internal structure can be visually recognized from the outside of the cover 48. When the cover 48 is at the close position, the front surface of the ink cartridge 50 attached to the ink supplying device 15 can be visually recognized from the light-transmitting portion 49.

[Ink supplying device 15]

Figure 4:
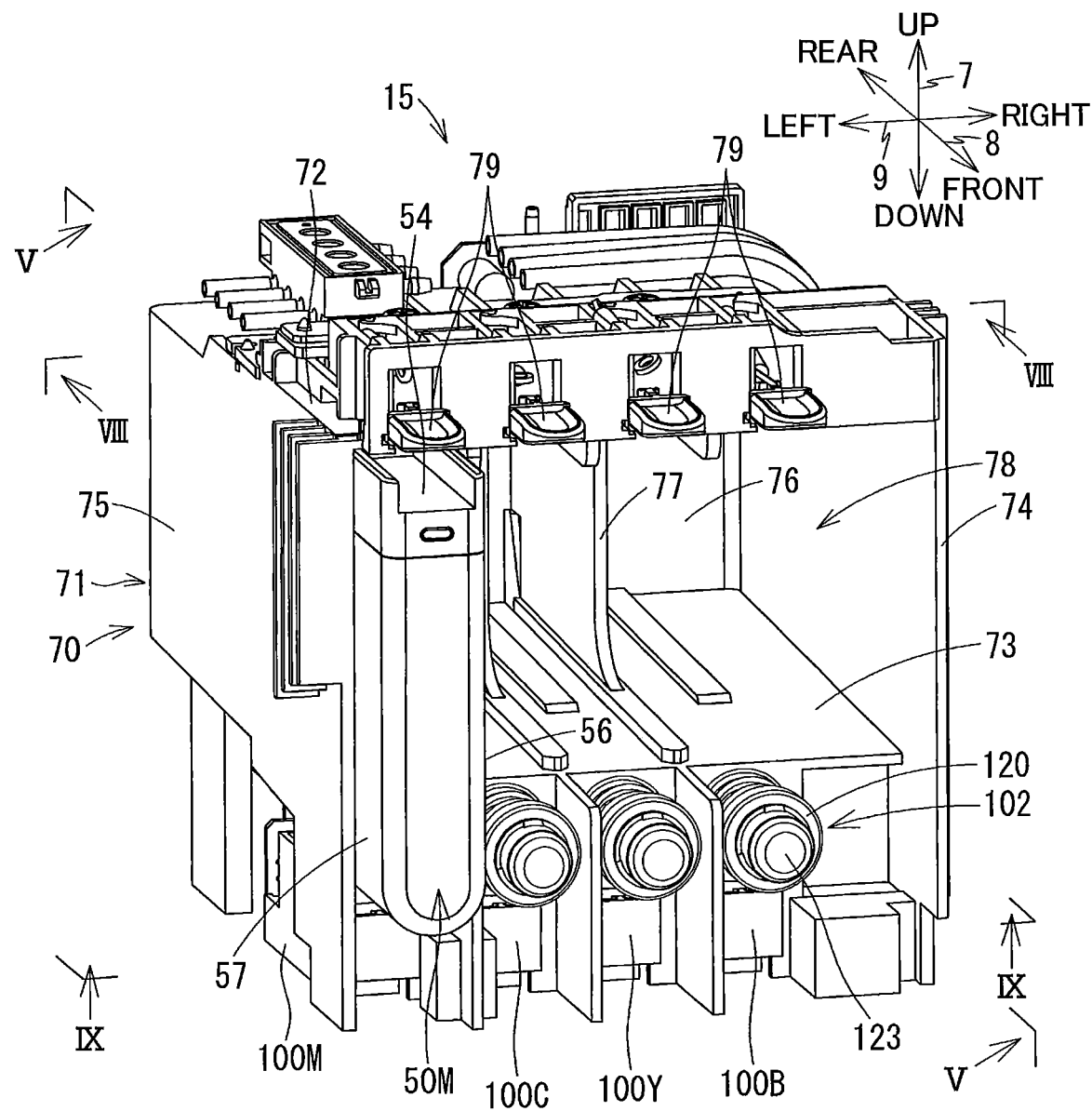
FIG. 4 is a perspective view of the ink supplying device according to the embodiment as viewed from a left front side thereof.

As illustrated in FIGS. 1, 3 and 4, the ink supplying device 15 (an example of a liquid supplying device) is provided with a housing case 71, four sub tanks 100, an atmospheric communication portion 70 (see FIGS. 5 and 11), and a magenta ink cartridge 50M, a cyan ink cartridge 50C, a yellow ink cartridge 50Y, and a black ink cartridge 50B.

[Ink cartridge 50]

As illustrated in FIGS. 1 and 3, The magenta ink cartridge 50M, the cyan ink cartridge 50C, the yellow ink cartridge 50Y, and the black ink cartridge 50B are collectively referred to as ink cartridges 50 (an example of cartridges) unless it is particularly necessary to distinguish in this specification.

FIG. 4 illustrates a state in which only the magenta ink cartridge 50M positioned at the leftmost side in the left-right direction 9 among the four ink cartridges 50 is housed in the housing case 71.

Figure 5:
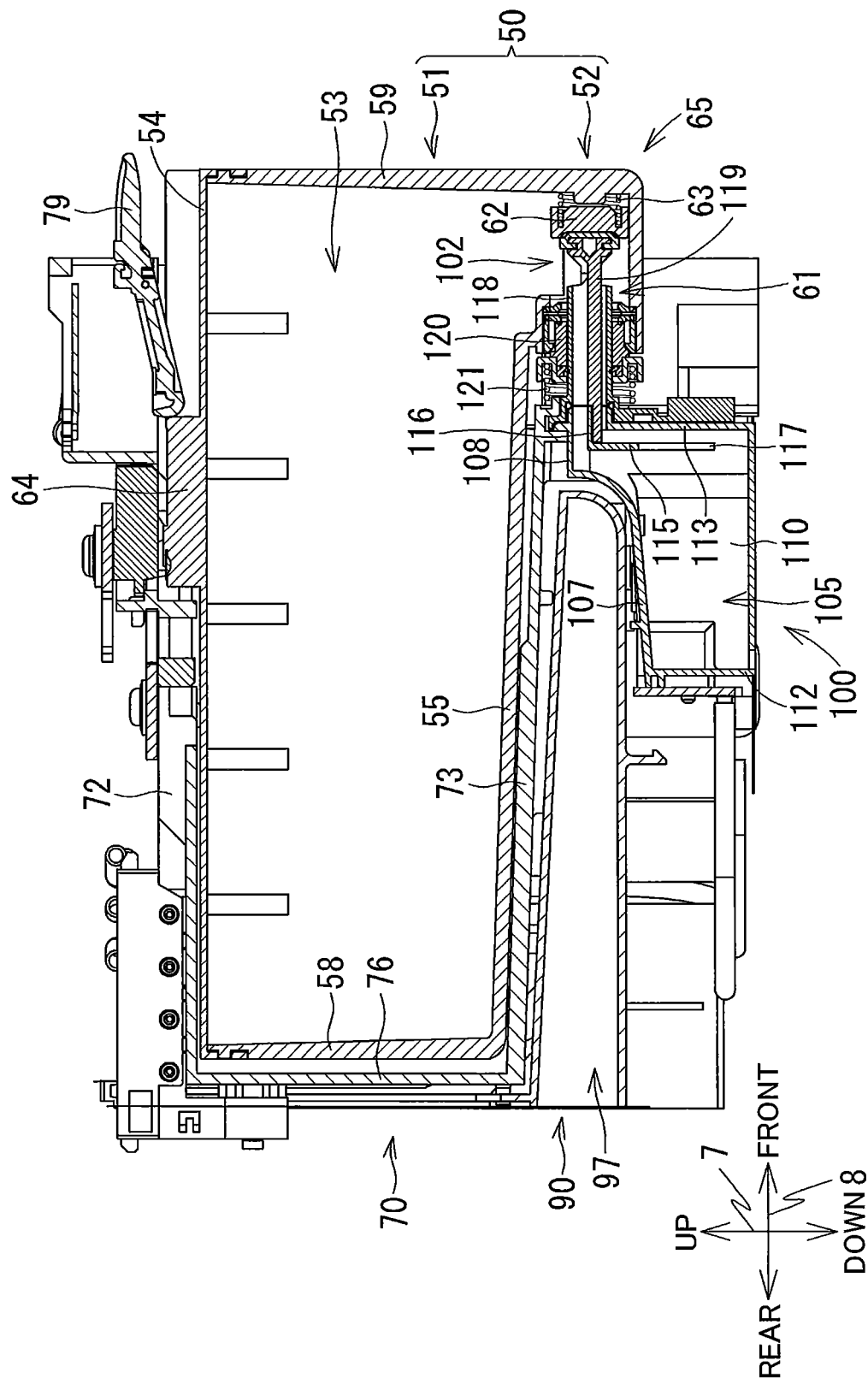
FIG. 5 is a cross-sectional view taken along a line V-V in FIG. 4.
Figure 6:
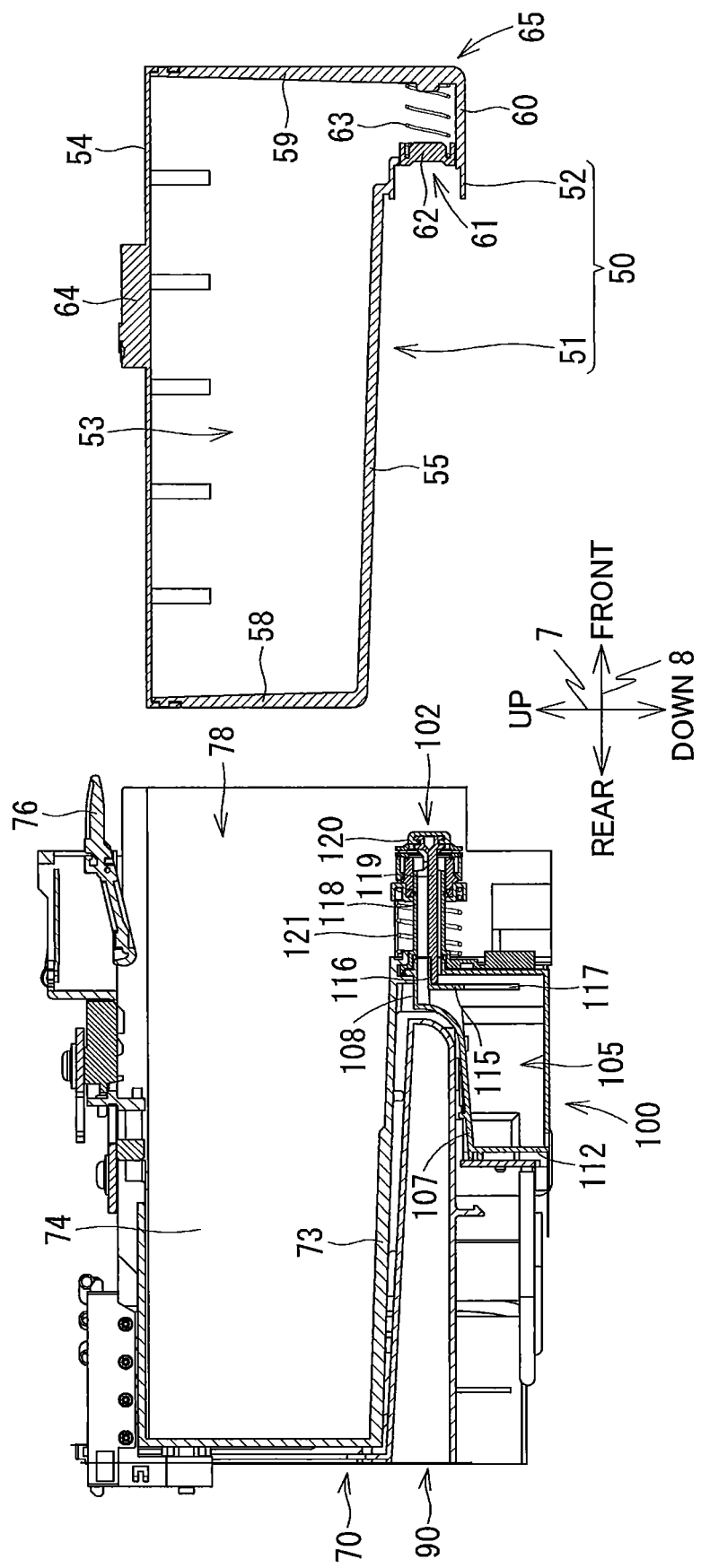
FIG. 6 is a cross-sectional view taken along the line V-V in FIG. 4 in a state where an ink cartridge is detached.

As illustrated in FIGS. 5 and 6, the ink cartridge 50 is provided with a cartridge main body 51 and a joint receiving portion 52. The cartridge main body 51 has a first storage chamber 53 that stores ink (an example of liquid).

The cartridge main body 51 has a substantially rectangular parallelepiped box shape. The cartridge main body 51 has a substantially rectangular shape as viewed from the up-down direction 7 and the front-rear direction 8. The cartridge main body 51 has a protruding portion 65 protruding downward at the front end portion of the cartridge main body 51. The cartridge main body 51 has an upper wall 54, a sub-lower wall 55, a right wall 56 (see FIG. 4), a left wall 57 (see FIG. 4), a rear wall 58, a front wall 59, and a lower wall 60. The lower wall 60 is positioned at the front part and the lower end part of the cartridge main body 51, and is positioned below the sub-lower wall 55. The sub-lower wall 55 is positioned rearward of the lower wall 60. The cartridge main body 51 has a communication port 61 which is opened rearward (an example of the horizontal direction) at the protruding portion 65 and in communication with the first storage chamber. The communication port 61 is an opening which is defined by the sub-lower wall 55, the lower wall 60, the right wall 56, and the left wall 57. The communication port 61 is an example of a communicating opening.

On the upper wall 54, an abutment portion 64 protruding upward is provided at the central portion in the front-rear direction 8. The abutment portion 64 is a portion that abuts against a lock lever 79 (to be described later) of the housing case 71.

The upper surface of the sub-lower wall 55 that defines the bottom surface of the first storage chamber 53 is inclined downward toward the protruding portion 65 in the front-rear direction 8.

The joint receiving portion 52 has a cylindrical shape extending rearward from the portion surrounding the communication port 61 in the cartridge main body 51. The joint receiving portion 52 is a portion into which a joint 102 (to be described later) of the sub tank 100 is inserted.

FIG. 5 illustrates an attachment state where the ink cartridge 50 is attached to the sub tank 100. FIG. 6 illustrates a separated state where the ink cartridge 50 is separated from the sub tank 100. The attachment state will be illustrated in detail below.

The joint receiving portion 52 is provided with a plug member 62 capable of closing the communication port 61, and a spring 63 which urges the plug member 62 rearward. As illustrated in FIG. 6, in a state in which no external force is applied to the ink cartridge 50, the plug member 62 is at the position which closes the communication port 61. The spring 63 extends in the front-rear direction 8 between the plug member 62 and the front wall 59, and can be compressed in the front-rear direction 8. As illustrated in FIG. 5, when a forward external force greater than the elastic force of the spring 63 is applied to the plug member 62 by the joint 102, the plug member 62 moves forward and is separated from the communication port 61.

[Housing case 71]

The housing case 71 has a rectangular parallelepiped box shape having an open front end. The housing case 71 has an upper wall 72, a lower wall 73, a right wall 74, a left wall 75, a rear wall 76, and three partition walls 77. The upper wall 72, the lower wall 73, the right wall 74, the left wall 75, and the rear wall 76 define an internal space 78 that has an open front end. The three partition walls 77 are walls parallel to the right wall 74 and the left wall 75, and partition the internal space 78 into four spaces. Each of the four ink cartridges 50 can be mounted or attached in each of the partitioned four spaces.

[Lock lever 79]

As illustrated in FIGS. 4, 5, and 6, the housing case 71 is provided with the lock lever 79 that holds the ink cartridge 50 in the internal space 78. The lock lever 79 is a plate-like member extending in the front-rear direction. The central portion of the lock lever 79 is provided on the upper wall 72 so as to be rotatable about an axis extending in the left-right direction 9. The lock lever 79 rotates between a lock position inclined rearward and an unlock position inclined forward. In a state where no external force is applied, the lock lever 79 is inclined rearward by its own weight and positioned at the lock position. At the lock position, the rear end portion of the lock lever 79 abuts against the front surface of the abutment portion 64 of the ink cartridge 50 in the internal space 78, and restricts the ink cartridge 50 from moving forward in the front-rear direction 8. When the front end portion of the lock lever 79 of the lock position is pressed downward by the user's finger, the lock lever 79 rotates from the lock position to the unlock position. At the unlock position, the rear end portion of the lock lever 79 is positioned above the front surface of the abutment portion 64. Since the lock lever 79 at the unlock position does not abut against the abutment portion 64 of the ink cartridge 50 which moves forward in the front-rear direction 8, the ink cartridge 50 can be detached from the housing case 71.

[Sub tank 100]

FIGS. 4 to 11 illustrate a sub tank 100 (an example of a tank). The sub tank 100 is positioned below the lower wall 73 of the housing case 71.

Figure 7:
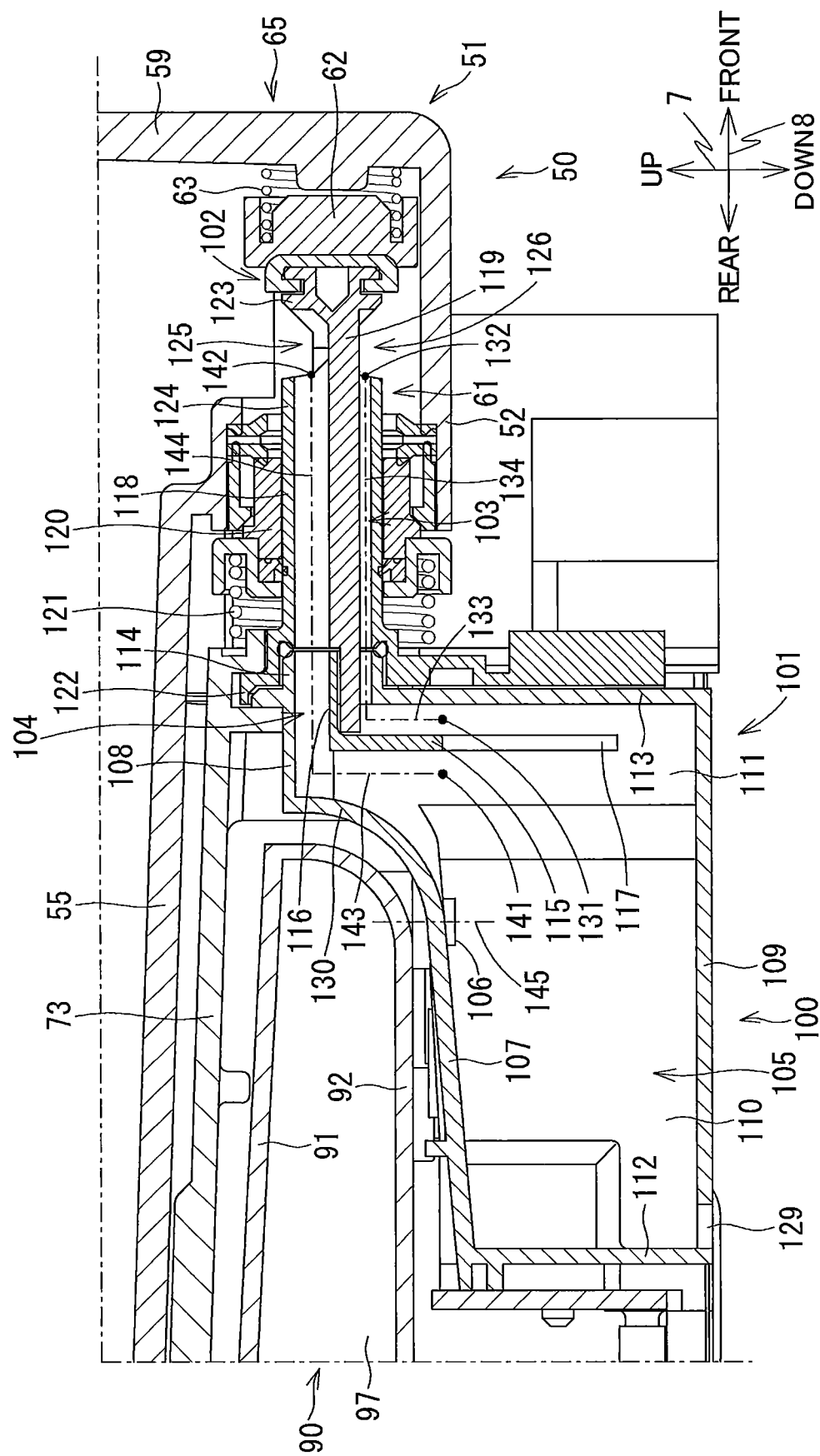
FIG. 7 is a cross-sectional view taken along the line V-V in FIG. 4 indicating a sub tank and a vicinity thereof.

As illustrated in FIG. 7, the sub tank 100 is provided with a tank main body 101 and the joint 102. A second storage chamber 105 which stores ink is formed inside the tank main body 101. The sub tank 100 is provided with a liquid flow passage 103 (example of a liquid passage) and a gas flow passage 104 (example of a gas passage) that communicate with the second storage chamber 105. The liquid flow passage 103 and the gas flow passage 104 are formed inside the tank main body 101 and inside the joint 102. Further, the sub tank 100 is provided with an atmospheric communication port 106 (see FIGS. 9, 10, and 12A) that causes the second storage chamber 105 to communicate with the outside. The atmospheric communication port 106 is an example of an air communication portion.

[Liquid flow passage 103 and gas flow passage 104]

As illustrated in FIG. 7, the liquid flow passage 103 and the gas flow passage 104 are positioned in parallel.

The liquid flow passage 103 has a first opening 131, a second opening 132, a vertical portion 133 as an example of a first vertical portion, and a horizontal portion 134 as an example of a first horizontal portion. The first opening 131 is an opening which is formed on one end side (a rear end side) of the liquid flow passage 103 and communicates with the second storage chamber 105. The first opening 131 is opened along the up-down direction 7. The second opening 132 is an opening which is formed on the other end side (a front end side) opposite to the one end side of the liquid flow passage 103 and is opened to the outside or atmosphere. The second opening 132 is opened along the front-rear direction 8. The second opening 132 is positioned inside the first storage chamber 53 of the ink cartridge 50 in the attachment state of the ink cartridge 50. The vertical portion 133 is a portion extending upward (an example of a vertical direction) from the first opening 131 in the liquid flow passage 103. The horizontal portion 134 is a portion extending rearward (an example of a horizontal direction) from the second opening 132 in the liquid flow passage 103. The upper end portion of the vertical portion 133 is connected to the rear end portion of the horizontal portion 134.

The gas flow passage 104 has a first opening 141, a second opening 142, a vertical portion 143 as an example of a second vertical portion, and a horizontal portion 144 as an example of a second horizontal portion. The first opening 141 is an opening which is formed on one end side (a rear end side) of the gas flow passage 104 and allows communication between the gas flow passage 104 and the second storage chamber 105. The first opening 141 is opened along the up-down direction 7. The second opening 142 is an opening which is formed on the other end side (a front end side) opposite to the one end side of the gas flow passage 104, and is opened to the outside or atmosphere. The second opening 142 is opened along the front-rear direction 8. The second opening 142 communicates with the first storage chamber 53 of the ink cartridge 50 in a state where the ink cartridge 50 is attached to the sub tank 100. The vertical portion 143 is a portion extending upward (an example of the vertical direction) from the first opening 141 in the gas flow passage 104. The horizontal portion 144 is a portion extending rearward (an example of the horizontal direction) from the second opening 142 in the gas flow passage 104. The upper end portion of the vertical portion 143 is connected to the rear end portion of the horizontal portion 144.

[Tank main body 101]

The tank main body 101 has an approximately rectangular parallelepiped outer wall. The tank main body 101 has a substantially T shape (see FIGS. 9 and 10) as viewed in the up-down direction 7, has a substantially rectangular shape (see FIG. 8) as viewed in the front-rear direction 8, and has an L shape as viewed in the left-right direction 9 (see FIGS. 4 to 7).

Figure 8:
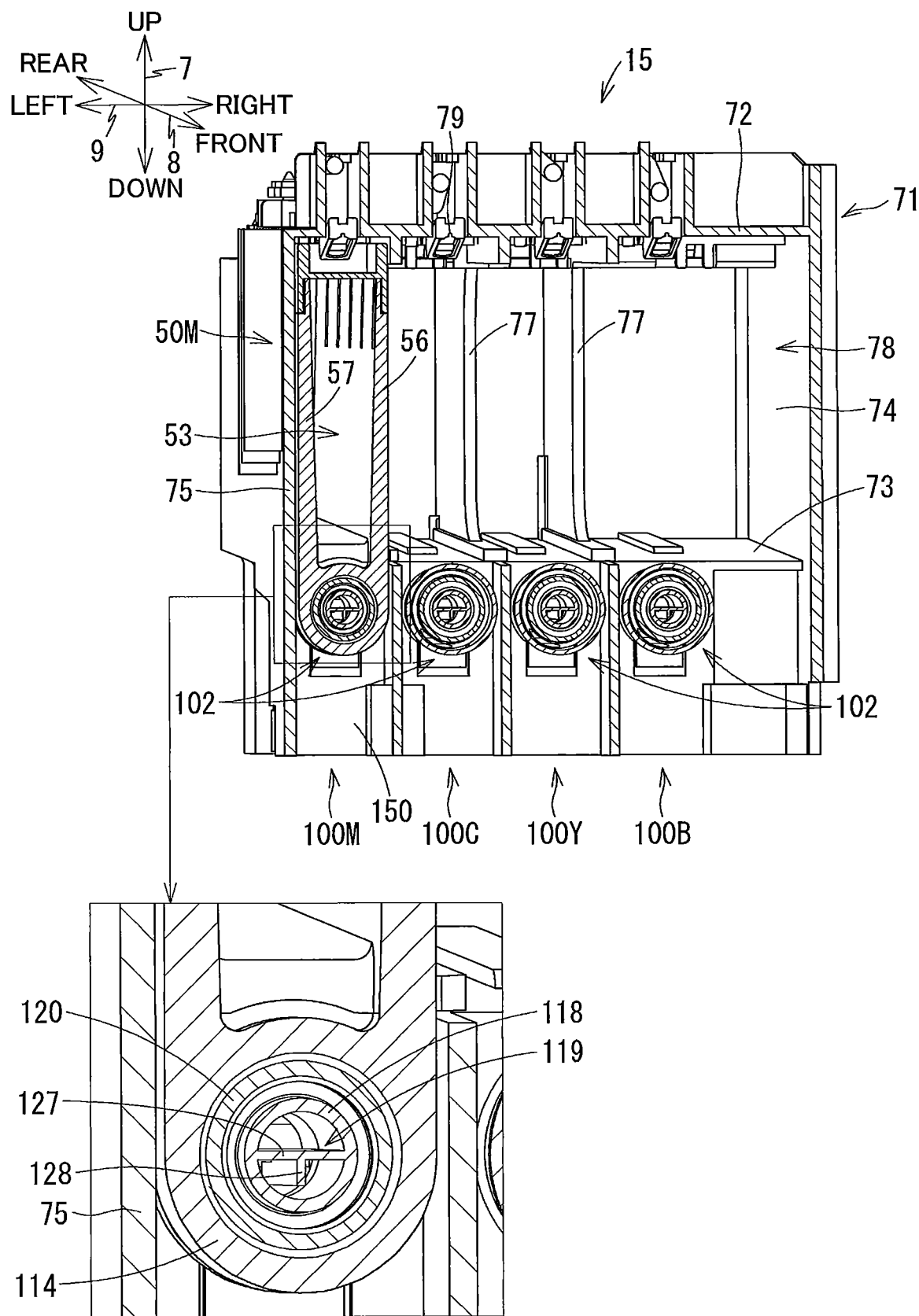
FIG. 8 is a cross-sectional view taken along a line VIII-VIII of FIG. 4.
Figure 9:
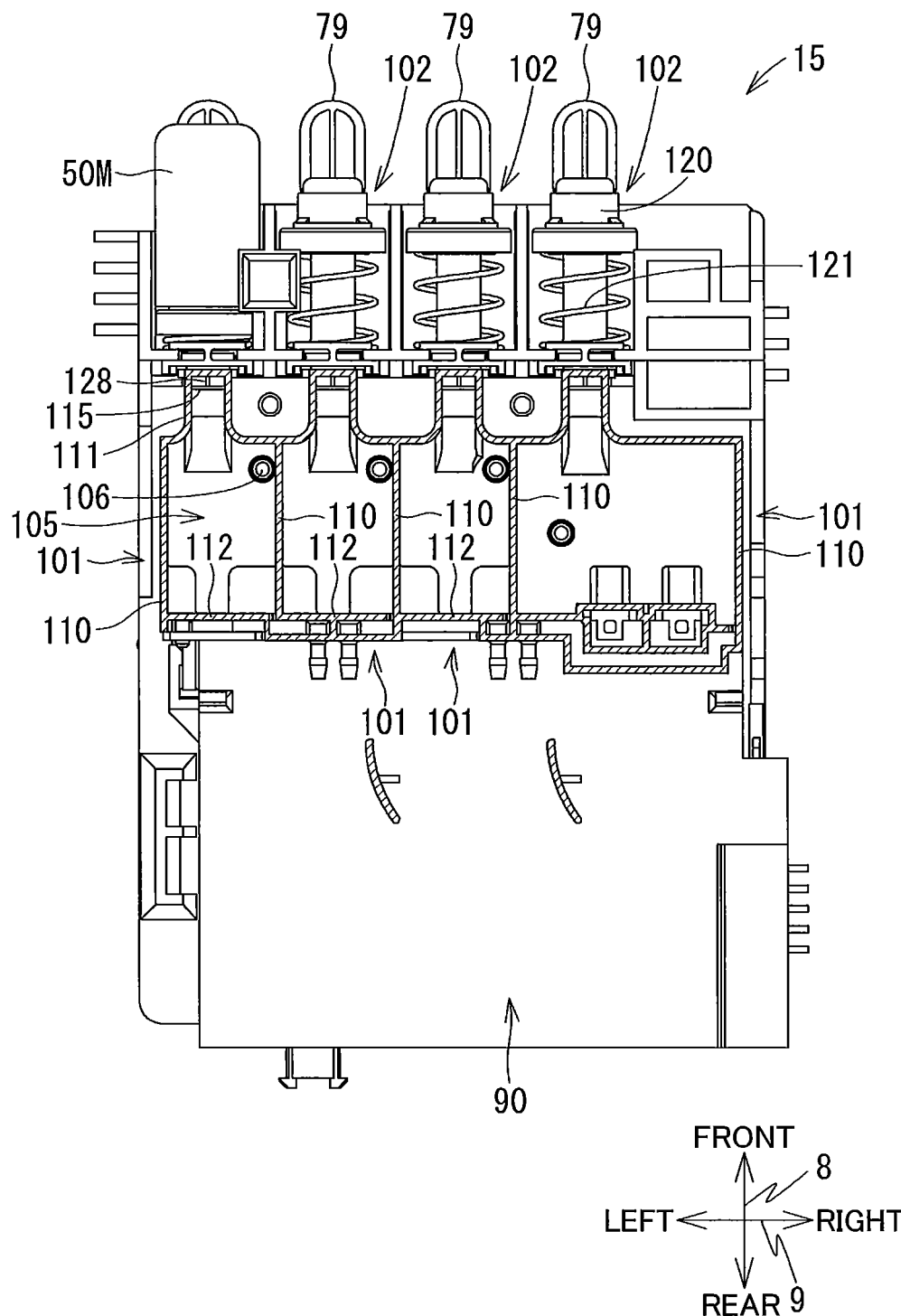
FIG. 9 is a cross-sectional view taken along a line IX-IX of FIG. 4.

As illustrated in FIGS. 4 to 11, the outer wall of the tank main body 101 has a rear upper wall 107, a bent upper wall 130, a front upper wall 108, a lower wall 109, two rear side walls 110, two front bent side walls 111, a rear wall 112, and a front wall 113. The rear upper wall 107 is a wall that extends forward, while being inclined upward from the rear end with respect to the horizontal plane. The bent upper wall 130 is a wall extending from the front end of the rear upper wall 107 and is bent upward from the front. The front upper wall 108 extends forward from the upper end of the bent upper wall 130 in parallel with the horizontal plane. The lower wall 109 extends in the front-rear direction 8 in parallel with the horizontal plane. The lower wall 109 has a T shape as viewed from the up-down direction 7. The rear side wall 110 connects the rear upper wall 107 and the lower wall 109 in the up-down direction 7. The rear side wall 110 has a substantially rectangular shape as viewed from the left-right direction 9. As illustrated in FIG. 9, the inside of the tank main body 101 is divided into four sections by three rear side walls 110. In other words, the rear side wall 110 is shared by the adjacent sections inside the tank main body 101. The front bent side wall 111 connects the bent upper wall 130, the front upper wall 108 and the lower wall 109 in the up-down direction 7. The front bent side wall 111 has a substantially rectangular shape as viewed from the left-right direction 9, and has an L shape in which the corner portion draws an arc shape as viewed in the up-down direction 7. The rear wall 112 extends upward from the rear end portion of the lower wall 109, and is connected to the two rear side walls 110 and the rear upper wall 107 positioned on the left and right sides. The front wall 113 extends upward from the front end portion of the lower wall 109, and is connected to the two front bent side walls 111 positioned on the left and right sides.

Figure 11:
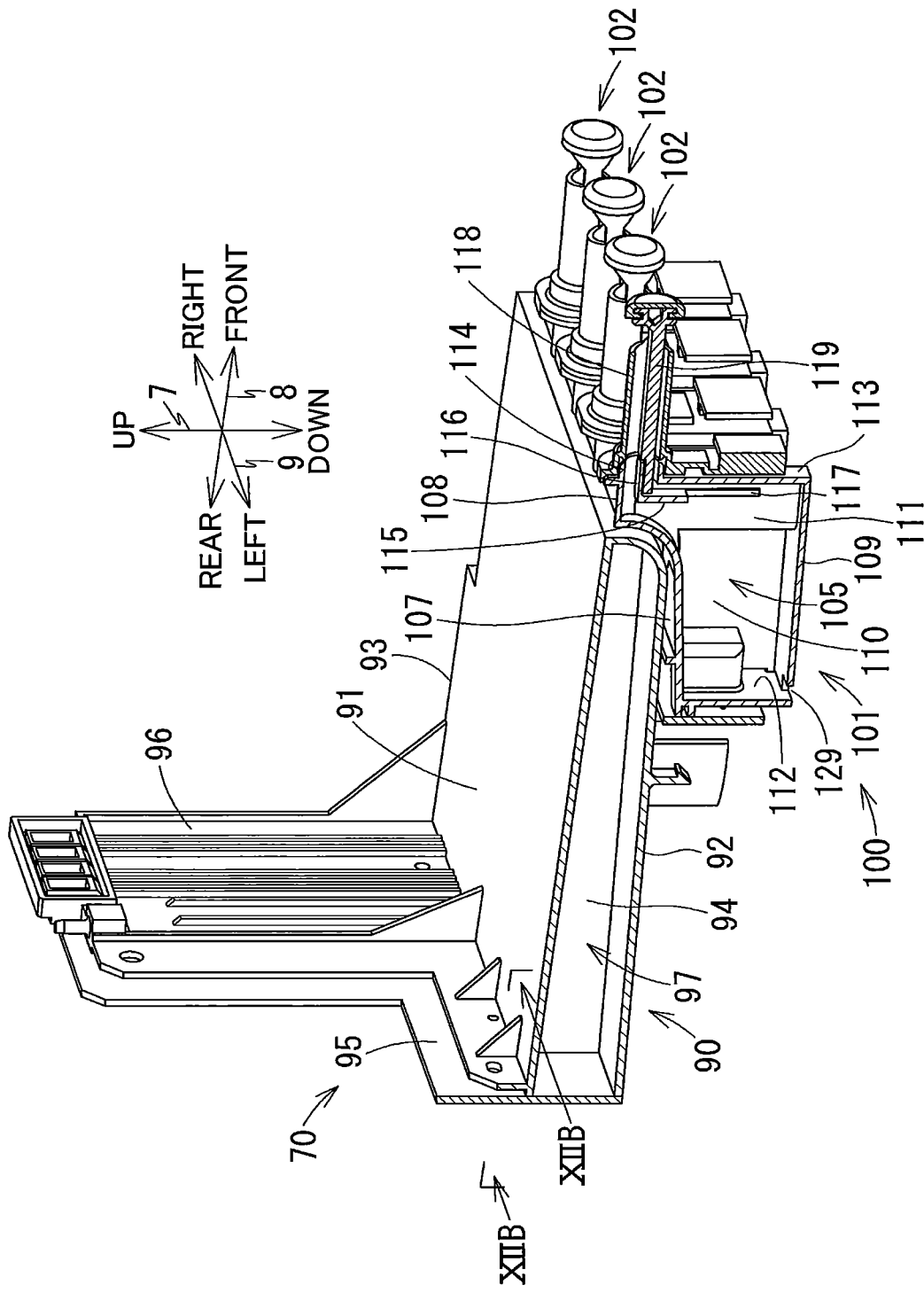
FIG. 11 is a perspective view of the sub tank and a buffer tank according to the embodiment as viewed from a left front side thereof.

As illustrated in FIGS. 7 and 11, a communication port 129 communicating with the second storage chamber 105 is formed on the lower wall 109. One end portion of the ink tube 32 is connected to the communication port 129, and the second storage chamber 105 and the recording head 39 are connected in communication with each other via the ink tube 32.

A cylindrical inner tubular portion 114 extending in the front-rear direction 8 is provided at the front end portion and the upper portion of the tank main body 101. The inside of the inner tubular portion 114 communicates with an opening formed by the front wall 113, the two front bent side walls 111 positioned on the left and right sides, and the front upper wall 108. A rear end portion of the joint 102 can be attached to the inner tubular portion 114. In the attachment state in which the joint 102 is attached to the inner tubular portion 114, the inside of the inner tubular portion 114 communicates with the inside of the joint 102.

[Wide-width portion 150 and narrow-width portion 151]

Figure 10:
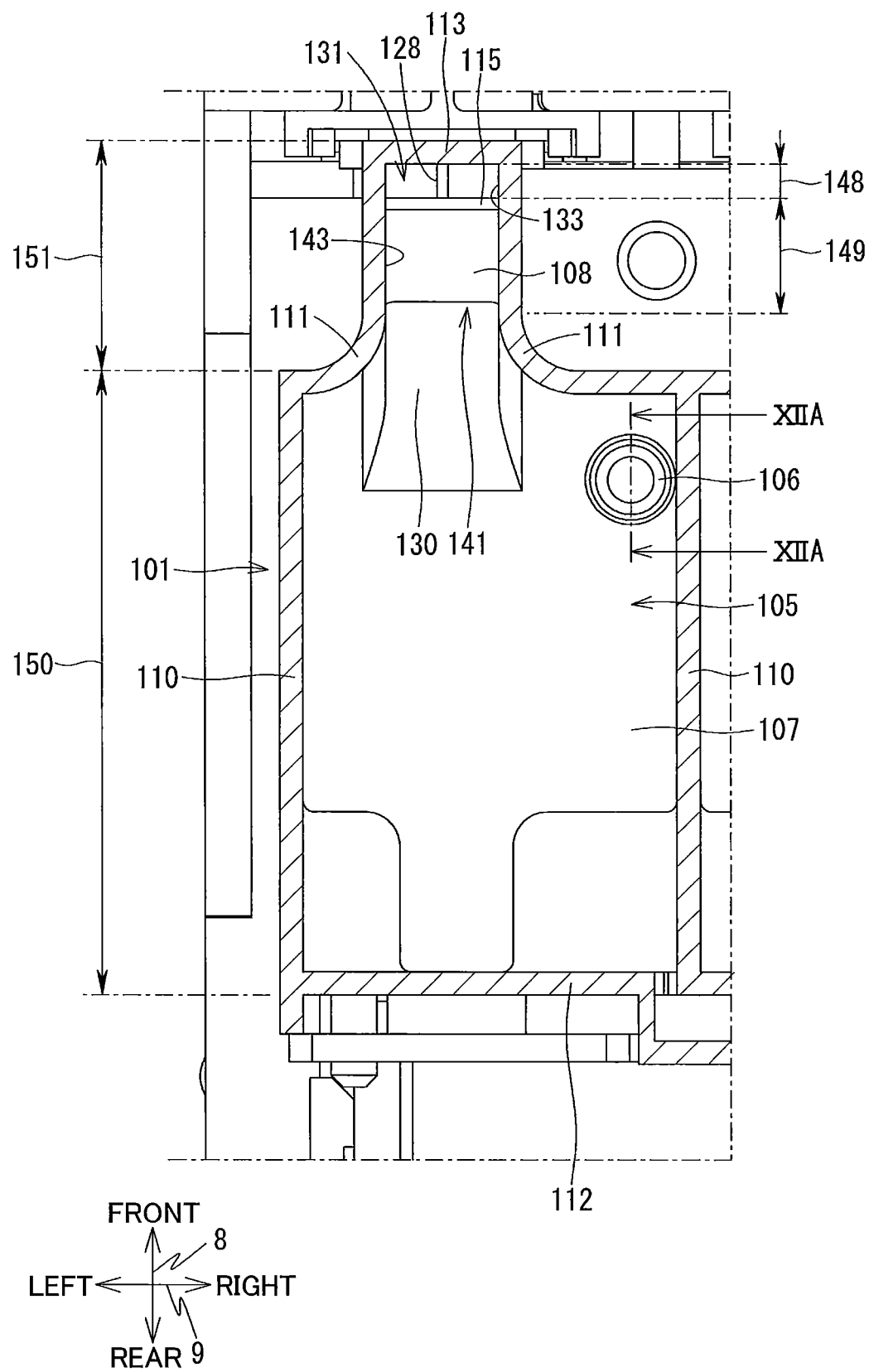
FIG. 10 is a cross-sectional view taken along the line IX-IX in FIG. 4 indicating the sub tank and a vicinity of the sub tank.

As illustrated in FIG. 10, the tank main body 101 has a wide-width portion 150 and a narrow-width portion 151 arranged in the front-rear direction 8. The wide-width portion 150 is a portion which is positioned at the rear portion of the tank main body 101 in the front-rear direction 8 and includes the two rear side walls 110 and the rear wall 112. The narrow-width portion 151 is a portion which is positioned at the front end portion (an example of one end portion in the first direction) of the tank main body 101 in the front-rear direction 8, and includes the two front bent side walls 111 and the front wall 113. The width of the narrow-width portion 151 in the left-right direction 9 (an example of a second direction orthogonal to the first direction) is smaller than the width of the wide-width portion 150 in the left-right direction 9. The second storage chamber 105 is formed over the wide-width portion 150 and the narrow-width portion 151.

As illustrated in FIG. 8, the width of the wide-width portion 150 in the left-right direction 9 is substantially equal to the width of the ink cartridge 50 in the left-right direction 9. Therefore, the width of the narrow-width portion 151 in the left-right direction 9 is smaller than the width of the ink cartridge 50 in the left-right direction 9.

[Vertical wall 115 and horizontal wall 116]

As illustrated in FIGS. 7 and 11, the tank main body 101 is provided with a vertical wall 115 and a horizontal wall 116 at the front part and the upper part of the tank main body 101.

The vertical wall 115 extends in the up-down direction 7 and positioned between the front wall 113 and the bent upper wall 130 in the front-rear direction 8. The vertical wall 115 connects the two front bent side walls 111 positioned on the left and right sides, and partitions the space defined by the front wall 113, the front upper wall 108, the bent upper wall 130, and the two front bent side walls 111 into the front and rear parts. The lower end position of the vertical wall 115 is the position of the first opening 131 of the liquid flow passage 103 in the up-down direction 7, and the position of the first opening 141 of the gas flow passage 104 in the up-down direction 7. The lower end level of the vertical wall 115 in the up-down direction 7 is equal to the lower end level of the front end of the rear upper wall 107. That is, the upper surface of the second storage chamber 105 is defined by a virtual plane passing through the lower end position of the vertical wall 115 and parallel to the horizontal plane, and the lower surface of the rear upper wall 107.

The horizontal wall 116 extends forward from the upper end of the vertical wall 115. The horizontal wall 116 extends to the inside of the inner tubular portion 114. The horizontal wall 116 connects the two front bent side walls 111 positioned on the left and right sides, and connects the inner surface of the inner tubular portion 114 in the left-right direction 9. The horizontal wall 116 partitions the space defined by the front upper wall 108 and the two front bent side walls 111, and the space defined by the inner tubular portion 114, into the upper and lower parts.

As illustrated in FIG. 10, the vertical portion 133 of the liquid flow passage 103 is defined by the vertical wall 115, the front wall 113, and the two front bent side walls 111. The shape of the cross section of the vertical portion 133 orthogonal to the up-down direction 7 is rectangular. The vertical portion 133 of the liquid flow passage 103 continuously extends along the two front bent side walls 111 partitioning the second storage chamber 105, and the two front bent side walls 111 have surfaces defining the vertical portion 133. Therefore, the width of the vertical portion 133 in the left-right direction 9 is the same as the width of the second storage chamber 105 defined by the narrow-width portion 151 in the left-right direction 9.

As illustrated in FIG. 10, the vertical portion 143 of the gas flow passage 104 is defined by the bent upper wall 130, the vertical wall 115, and the two front bent side walls 111. The shape of the cross section of the vertical portion 143 of the gas flow passage 104 orthogonal to the up-down direction 7 is rectangular. The vertical portion 143 continuously extends along the two front bent side walls 111 partitioning the second storage chamber 105, and the two front bent side walls 111 have surfaces defining the vertical portion 143. Therefore, the width of the vertical portion 143 of the gas flow passage 104 in the left-right direction 9 is the same as the width of the second storage chamber 105 in the left-right direction 9 defined by the narrow-width portion 151.

As illustrated in FIG. 10, a length 149 of the first opening 141 of the gas flow passage 104 in the front-rear direction 8 (an example of the horizontal direction) is longer than a length 148 of the first opening 131 of the liquid flow passage 103 in the front-rear direction 8 (an example of the horizontal direction). The length of the first opening 141 of the gas flow passage 104 in the left-right direction 9 is equal to the length of the first opening 131 of the liquid flow passage 103 in the left-right direction 9. Therefore, an opening area of the first opening 141 of the gas flow passage 104 is greater than the opening area of the first opening 131 of the liquid flow passage 103.

As illustrated in FIG. 7, in the vertical portion 143 of the gas flow passage 104, the opening area of the gas flow passage 104 is enlarged as it approaches the first opening 141 of the gas flow passage 104. In the vertical portion 133 of the liquid flow passage 103, the opening area of the liquid flow passage 103 is constant in the up-down direction 7.

As illustrated in FIG. 7, the horizontal portion 134 of the liquid flow passage 103 in the tank main body 101 is defined by the front upper wall 108, the horizontal wall 116, the two front bent side walls 111, and the inner tubular portion 114. The horizontal portion 144 of the gas flow passage 104 in the tank main body 101 is defined by the horizontal wall 116, the two front bent side walls 111, and the inner tubular portion 114.

[First rib 117]

As illustrated in FIGS. 7 and 11, the tank main body 101 is provided with a first rib 117 continuous with the vertical wall 115. The first rib 117 protrudes from the front bent side wall 111 and extends downward from the vertical wall 115. The first rib 117 and the lower wall 109 are separated from each other. The first ribs 117 are provided on each of the two front bent side walls 111 positioned on the left and right sides, and the two first ribs 117 are positioned in one second storage chamber 105 so as to be separated in the left-right direction 9.

[Joint 102]

As illustrated in FIGS. 4 to 9 and 11, the joint 102 is provided with a joint main body 118, an inner wall 119, a plug member 120 (see FIGS. 6 and 7), and a spring 121 (see FIGS. 6 and 7).

[Joint main body 118]

As illustrated in FIG. 7, the joint main body 118 is provided with an outer tubular portion 122 positioned at the rear end portion, a distal end portion 123 positioned at the front end portion, and a main body portion 124 that connects the outer tubular portion 122 and the distal end portion 123. The outer tubular portion 122 has a cylindrical shape and extends in the front-rear direction 8. The outer tubular portion 122 is fitted into the inner tubular portion 114 of the tank main body 101. As a result, the joint main body 118 is fixed to the tank main body 101. The distal end portion 123 has a disc shape having an axis in the front-rear direction 8 as an axial center. The main body portion 124 has a cylindrical shape and extends in the front-rear direction 8. An upper opening portion 125 and a lower opening portion 126, which are each opened upward and downward, are formed at the front end portion of the main body portion 124.

[Partition wall 127 and second rib 128]

As illustrated in FIGS. 7 and 8, the inner wall 119 is positioned inside the joint main body 118. The inner wall 119 extends rearward from the distal end portion 123 beyond the outer tubular portion 122. The inner wall 119 is provided with a partition wall 127 and a second rib 128. As illustrated in FIG. 8, the inner wall 119 has a T shape as viewed in the front-rear direction 8. The rear end surface of the partition wall 127 is in contact with the front end surface of the horizontal wall 116 in the tank main body 101. By the partition wall 127 and the horizontal wall 116, the internal space of the joining portion between the joint main body 118 and the tank main body 101 is partitioned into the liquid flow passage 103 and the gas flow passage 104.

The partition wall 127 is a wall that expands in the left-right direction 9 inside the joint main body 118. The partition wall 127 extends rearward from the distal end portion 123. The internal space of the joint main body 118 is partitioned into an upper part and a lower part by the partition wall 127.

The second rib 128 protrudes downward from the central portion of the partition wall 127 in the left-right direction 9. The second rib 128 extends rearward from the distal end portion 123. There is a gap between the second rib 128 and the inner surface of the joint main body 118.

The horizontal portion 134 of the liquid flow passage 103 in the joint 102 is defined by the inner surface of the joint main body 118 and the lower surface of the inner wall 119. The cross section of the horizontal portion 134 of the liquid flow passage 103 in the joint 102 has a substantially semicircular shape. More precisely, in the cross section of the horizontal portion 134, the semicircular upper portion is divided into right and left sides by the second rib 128, and the semicircular lower portion is connected without being divided into the right and left sides. The horizontal portion 144 of the gas flow passage 104 in the joint 102 is defined by the inner surface of the joint main body 118 and the upper surface of the inner wall 119. The cross section of the horizontal portion 144 of the gas flow passage 104 in the joint 102 has a semicircular shape.

[Plug member 120 and spring 121]

The plug member 120 is a cylindrical member, and is positioned outside the main body portion 124 of the joint main body 118. The plug member 120 is movable in the front-rear direction 8 along the main body portion 124. The front end portion of the spring 121 is fixed to the rear end portion of the plug member 120, and the rear end portion thereof abuts against a buffer tank 90 (to be described later) of the atmospheric communication portion 70 and the outer tubular portion 122 of the joint main body 118. The spring 121 urges the plug member 120 forward. In the state in which no external force is applied, the plug member 120 is positioned at the front end portion of the joint main body 118, and closes the upper opening portion 125 and the lower opening portion 126. When a rearward external force greater than the elastic force of the spring 121 is applied to the plug member 120, the plug member 120 moves rearward, and the upper opening portion 125 and the lower opening portion 126 are opened. When the ink cartridge 50 is attached, the joint receiving portion 52 of the ink cartridge 50 abuts against the plug member 120. The plug member 120 abutting against the joint receiving portion 52 moves rearward by an external force applied when the ink cartridge 50 is attached.

[Attachment state of ink cartridge 50]

As illustrated in FIGS. 5 and 7, in the attachment state in which the ink cartridge 50 is attached to the sub tank 100, the joint main body 118 of the sub tank 100 is inserted into the joint receiving portion 52 of the ink cartridge 50 in the front-rear direction 8, and is further inserted into the communication port 61. In this attachment state, the second opening 132 of the liquid flow passage 103 of the sub tank 100 and the second opening 142 of the gas flow passage 104 enter the first storage chamber 53 of the ink cartridge 50. As illustrated in FIGS. 4 and 5, the ink cartridge 50 can be separated from and attached to the sub tank 100 in the front-rear direction 8.

[Layout of ink cartridge 50 and sub tank 100]

The layout of the ink cartridge 50 and the sub tank 100 will be described. The layout will be described on the assumption that the ink cartridge 50 is attached to the housing case 71, and the ink cartridge 50 and the sub tank 100 are in the use posture as illustrated in FIG. 5.

As illustrated in FIG. 5, the protruding portion 65 of the ink cartridge 50 is substantially at the same position as the joint 102 in the up-down direction 7, but the portion above the protruding portion 65 of the ink cartridge 50 is positioned above the joint 102. Therefore, most of the first storage chamber 53 of the ink cartridge 50 is positioned above the joint 102. Also, the upper part of the sub tank 100, that is, the upper part above the vicinity of the bent upper wall 130 is positioned at the substantially same position as the joint 102. However, the portion below the vicinity of the bent upper wall 130 of the sub tank 100 is positioned below the joint 102. Therefore, most of the second storage chamber 105 of the sub tank 100 is positioned below the joint 102 in the up-down direction 7.

A portion above the protruding portion 65 of the first storage chamber 53 is positioned above the horizontal portion 134 of the liquid flow passage 103 and above the horizontal portion 144 of the gas flow passage 104. The second storage chamber 105 is positioned below the horizontal portion 134 of the liquid flow passage 103 and below the horizontal portion 144 of the gas flow passage 104. The lower portion of the first storage chamber 53 and the upper portion of the second storage chamber 105 are positioned in a line extending in the front-rear direction 8. The volume of the first storage chamber 53 is larger than the volume of the second storage chamber 105.

The horizontal portion 144 of the gas flow passage 104 is positioned above the horizontal portion 134 of the liquid flow passage 103.

As illustrated in FIG. 7, the first opening 131 of the liquid flow passage 103, the first opening 141 of the gas flow passage 104, and the atmospheric communication port 106 are disposed in this order from the communication port 61 of the first storage chamber 53 in the rearward direction or in the direction away from the first storage chamber 53. The position of the communication port 61 of the first storage chamber 53 in the up-down direction 7 corresponds to the position in the up-down direction 7 in which the first storage chamber 53 and the liquid flow passage 103 communicate with each other, and the direction facing rearward from the communication port 61 at the position in the up-down direction 7 is a direction away from the first storage chamber 53.

[Atmospheric communication portion 70]

As illustrated in FIGS. 5, 11, and 12, the atmospheric communication portion 70 is provided with the buffer tank 90, a communication flow passage 145, and an atmospheric communication passage 147 as an example of an air communication passage.

[Buffer tank 90]

As illustrated in FIGS. 5 and 11, the buffer tank 90 is positioned below the housing case 71 and above the sub tank 100.

As illustrated in FIGS. 5 and 11, the buffer tank 90 is provided with an upper wall 91, a lower wall 92, two side walls 93, three partition walls 94, a rear wall 95, and a protruding wall 96. The upper wall 91 is a wall that spreads along a surface inclined with respect to a horizontal plane. The lower wall 92 is a wall that bends upward toward the front, while extending in the direction parallel to the horizontal plane from the rear. The front end portion of the lower wall 92 is connected to the front end portion of the upper wall 91. The two side walls 93 are walls that connect both end portions of the upper wall 91 and the lower wall 92 in the left-right direction 9 to each other in the up-down direction 7. The three partition walls 94 are walls disposed in parallel with the two side walls 93 in the left-right direction 9. The rear wall 95 is a wall which connects the rear end portions of the upper wall 91 and the lower wall 92 to each other. The protruding wall 96 is a wall extending upward from the rear end portion of the upper wall 91. A gap is formed in the front-rear direction 8 between the rear wall 95 and the protruding wall 96.

The lower wall 73 of the housing case 71 is positioned above the upper wall 91 of the buffer tank 90. The upper wall 91 of the buffer tank 90 supports the lower wall 73 of the housing case 71. Therefore, the upper wall 91 of the buffer tank 90 can support the ink cartridge 50 housed in the housing case 71 via the lower wall 73 of the housing case 71.

[Buffer chambers 97]

The internal space defined by the upper wall 91, the lower wall 92, the two side walls 93, and the rear wall 95 is partitioned as four buffer chambers 97 by the three partition walls 94. The four buffer chambers 97 are communicatively connected to the four sub tanks 100, respectively. The four buffer chambers 97 are spaces which can store air sent to the first storage chamber 53 as the ink in the first storage chamber 53 is supplied to the second storage chamber 105 by the gas-liquid substitution. The four buffer chambers 97 are positioned above the recording unit 24.

As illustrated in FIG. 5, the buffer chamber 97 is positioned below the first storage chamber 53, and the second storage chamber 105 is positioned below the buffer chamber 97. A part of the first storage chamber 53 and a part of the buffer chamber 97 formed in the protruding portion 65 are positioned in a line extending in the front-rear direction 8 (an example of the horizontal direction). Further, a part of the protruding portion 65, a part of the joint 102, and a part of the buffer tank 90 are positioned in a line extending in the front-rear direction 8 (an example of the horizontal direction). Further, a part of the first storage chamber 53 and a part of the buffer chamber 97 are positioned in a line extending in the up-down direction 7.

[Communication flow passage 145]

Figure 12A:
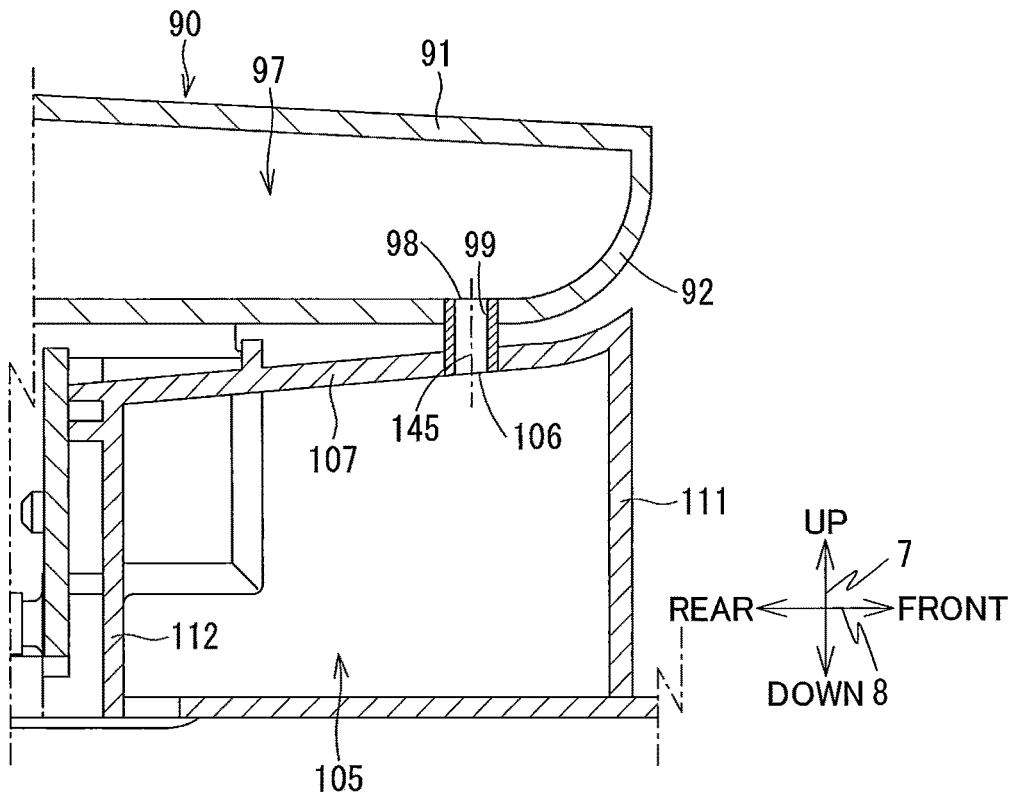
FIG. 12A is a cross-sectional view taken along a line XIIA-XIIA of FIG. 10.

As illustrated in FIG. 12A, the lower wall 92 of the buffer tank 90 has an opening portion 98 communicating with the buffer chamber 97. The ink supplying device 15 is provided with a connection pipe 99 that connects the atmospheric communication port 106 of the tank main body 101 and the opening portion 98 of the buffer tank 90. The connection pipe 99 has a cylindrical shape. A communication flow passage 145 that connects the second storage chamber 105 and the buffer chamber 97 is formed by the inner surface of the connection pipe 99. The communication flow passage 145 extends in the up-down direction 7.

[Atmospheric communication passage 147]

Figure 12B:
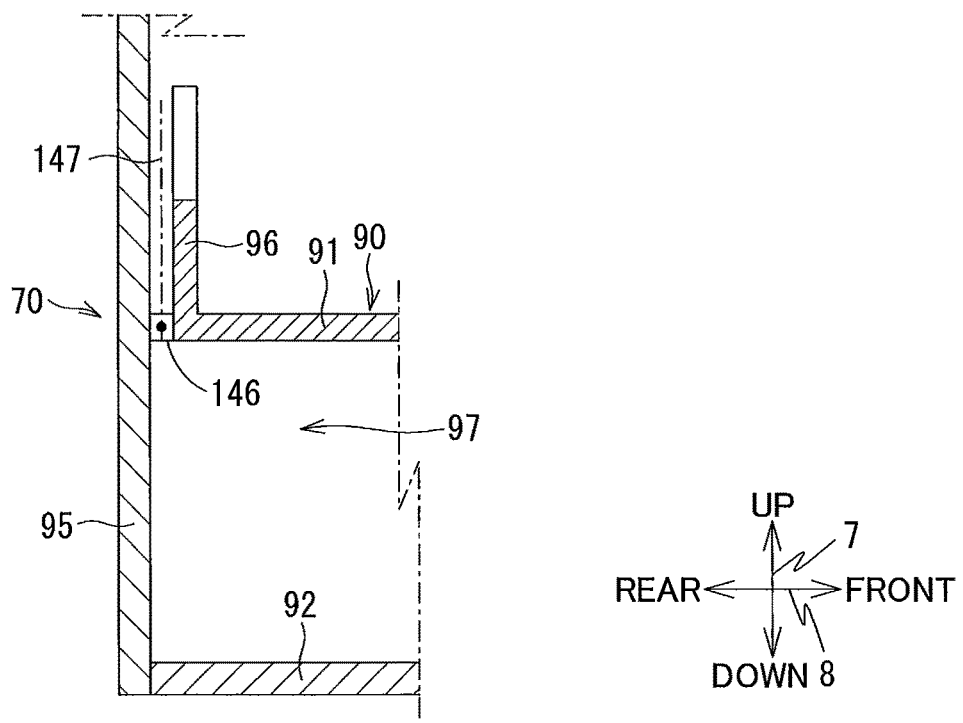
FIG. 12B is a cross-sectional view taken along a line XIIB-XIIB of FIG. 11.

As illustrated in FIG. 12B, an opening portion 146 is formed for each buffer chamber 97 at the rear end portion of the upper wall 91. The upper wall 91 has four opening portions 146 behind the protruding wall 96. The lower surface of the upper wall 91 is inclined upward in the direction (rearward) opposite to the opening portion 98 along the front-rear direction 8 (an example of the horizontal direction). The opening portion 146 is opened to the upper wall 91 at the position where the lower surface of the upper wall 91 is positioned the highest in the up-down direction 7. That is, the atmospheric communication passage 147 is connected to the buffer chamber 97 at a highest position of the upper wall 91 of the buffer tank 90. Here, the atmospheric communication passage 147 extending in the up-down direction 7 is formed by the front surface of the rear wall 95 and the rear surface of the protruding wall 96. The atmospheric communication passage 147 extends upward from the buffer chamber 97 via the opening portion 146, and communicates with the outside of the casing 14 of the multifunction machine 10.

[Operation in embodiment]

First, the flow of ink and air at the time of initial introduction in which the ink cartridge 50 is initially attached to the empty sub tank 100 will be described.

In a state (a previous state) before the initial introduction illustrated in FIG. 6, the ink cartridge 50 is separated from the sub tank 100. In the previous state, the communication port 61 of the ink cartridge 50 is closed by the plug member 62, and the first storage chamber 53 is hermetically sealed by the ink cartridge 50. Therefore, the ink filled in the first storage chamber 53 does not leak to the outside. On the other hand, in the previous state, the upper opening portion 125 and the lower opening portion 126 (see FIG. 7) of the sub tank 100 are closed by the plug member 120. Therefore, the second opening 132 of the liquid flow passage 103 and the second opening 142 of the gas flow passage 104 communicating with the second storage chamber 105 are closed to the outside. The second storage chamber 105 has the atmospheric communication port 106 (see FIG. 7) and the communication port 129 (see FIG. 7) as parts communicating with the outside, in addition to the liquid flow passage 103 and the gas flow passage 104. The atmospheric communication port 106 communicates with the outside air of the multifunction machine 10 via the buffer chamber 97. The communication port 129 communicates with the recording head 39 via the ink tube 32. However, in a rest state of the recording head 39, the ink does not flow out of the communication port 129. Here, the second storage chamber 105 is not filled with ink, and the second storage chamber 105 is in an empty state.

As illustrated in FIGS. 5 and 7, when the ink cartridge 50 is attached to the sub tank 100, the plug member 62 which closes the communication port 61 retreats forward against the urging force of the spring 63, and the plug member 120, which closes the upper opening portion 125 and the lower opening portion 126, retreats rearward against the urging force of the spring 121. As a result, the first storage chamber 53 communicates with the second storage chamber 105 via the liquid flow passage 103 and the gas flow passage 104. Then, the ink in the first storage chamber 53 of the ink cartridge 50 naturally drops via the liquid flow passage 103, and is introduced into the second storage chamber 105 of the sub tank 100. Since the atmospheric communication port 106 is opened to the outside air, air having the same volume as the amount of ink introduced into the second storage chamber 105 is introduced into the first storage chamber 53 via the atmospheric communication port 106 and the gas flow passage 104. In this way, the first storage chamber 53 substitutes air for the ink in the first storage chamber 53 (gas-liquid substitution), the ink in the first storage chamber 53 is supplied to the second storage chamber 105.

As the gas-liquid substitution progresses, the liquid level of the ink in the second storage chamber 105 rises. When the liquid level of the ink rises to reach the lower end position of the vertical wall 115, the first opening 141 of the gas flow passage 104 is closed. Then, since the gas-liquid substitution cannot be performed, the supply of ink from the first storage chamber 53 to the second storage chamber 105 is stopped. In this way, ink is supplied at the time of initial introduction.

Next, the flow of ink and air when the printing operation is executed by the printer unit 11 in the attachment state of the ink cartridge 50 will be described.

When ink is ejected from the recording head 39 at the time of executing the recording operation, the ink in the second storage chamber 105 is sucked from the communication port 129 to the recording head 39. As the ink decreases, the liquid level of the ink in the second storage chamber 105 descends. Thus, the first opening 141 of the closed gas flow passage 104 is opened. When the first opening 141 of the gas flow passage 104 is opened, the gas-liquid substitution is executed as described above, and ink is supplied from the first storage chamber 53 to the second storage chamber 105. Ink is supplied from the first storage chamber 53 to the second storage chamber 105 so as to compensate for the consumption of ink in the recording head 39, and the height of the liquid level of the ink in the second storage chamber 105 is kept at the position of the first opening 141 of the gas flow passage 104.

When the ink in the first storage chamber 53 becomes empty, by replacing the empty ink cartridge 50 with another ink cartridge 50 filled with ink, the multifunction machine 10 can continuously execute the recording operation.

[Technical effect of embodiment]

With the ink supplying device 15 according to the embodiment, since the first storage chamber 53 and the second storage chamber 105 are connected to each other via the gas flow passage 104 and the liquid flow passage 103, ink in the first storage chamber 53 can be supplied to the second storage chamber 105 by the gas-liquid substitution. Since the first storage chamber 53 is disposed above the second storage chamber 105, ink is supplied from the first storage chamber 53 to the second storage chamber 105 in accordance with the decrease in the ink in the second storage chamber 105. The buffer chamber 97 is positioned below the first storage chamber 53 and the second storage chamber 105 is positioned below the buffer chamber 97. Accordingly, the space to dispose the first storage chamber 53, the second storage chamber 105, and the buffer chamber 97 is reduced as compared to the case where the first storage chamber 53, the second storage chamber 105, and the buffer chamber 97 are disposed in other positions. The reduction of the space can suppress increasing the size of the device that supplies ink to the recording unit 24, which includes the ink cartridge 50, the sub tank 100, and the buffer tank 90.

Further, the atmospheric communication passage 147 and the ink cartridge 50 are both disposed above the buffer tank 90 to thereby reduce the width in the front-rear direction 8 and the left-right direction 9 of the device that supplies ink to the recording unit 24.

Further, in a case where the multifunction machine 10 is inclined, communication flow passage 145 extending in the gravity direction prevents the countercurrent of the liquid in the second storage chamber 105, flowing from the second storage chamber 105 to the buffer tank 90.

Further, the ink cartridge 50 and the buffer tank 90 respectively defining the first storage chamber 53 and the buffer chamber 97 are arranged or aligned in the same line extending in the front-rear direction 8. In other words, a portion of the first storage chamber 53 is horizontally aligned with a portion of the buffer chamber 97. Accordingly, this configuration can suppress increasing the size in the up-down direction 7 of the device that supplies ink to the recording unit 24.

Further, the ink cartridge 50 and the buffer tank 90 respectively defining the first storage chamber 53 and the buffer chamber 97 are arranged or aligned in the same line extending in the up-down direction 7. In other words, a portion of the first storage chamber 53 is vertically aligned with a portion of the buffer chamber 97. Accordingly, this configuration can suppress increasing the size in the front-rear direction 8 and the left-right direction 9 of the device that supplies ink to the recording unit 24.

Further, the ink cartridge 50 is attachable to and detachable from the sub tank 100 in the front-rear direction 8, thereby providing a good operability in the exchanging operation of the ink cartridge 50.

The liquid flow passage 103 and the gas flow passage 104 have the first openings 131, 141 below the second openings 132, 142 in the second storage chamber 105. Accordingly, the ink in the second storage chamber 105 is prevented from causing a countercurrent in the liquid flow passages 103, 104.

The buffer tank 90, the joint 102, and the protruding portion 65 that is a part of the ink cartridge 50 are arranged or aligned in a line extending in the front-rear direction 8. In other words, a portion of the protruding portion 65, a portion of the joint 50, and a portion of the buffer tank 90 are aligned in the horizontal direction. Accordingly, this configuration can suppress increasing the size in the up-down direction 7 of the device that supplies ink to the recording unit 24.

The upper surface of the sub-lower wall 55 in the ink cartridge 50 is inclined downward toward the protruding portion 65. Accordingly, the ink in the first storage chamber 53 can easily flow toward the communication port 61 even when the ink in the first storage chamber 53 is consumed and the liquid surface is close to the sub-lower wall 55.

Further, the bottom surface of the upper wall 91 in the buffer tank 90 is inclined upward toward the atmospheric communication passage 147. Accordingly, when ink flows in the counter direction to enter the buffer chamber 97, air is not stuck on the bottom surface of the upper wall 91 in the buffer tank 90. Such stuck air may prevent the ink in the buffer chamber 97 from flowing back along communication flow passage 145. In this case, the gas flow passage 104 is shut by air to prevent the gas-liquid substitution. The above configuration avoids causing the stuck air, whereby the gas-liquid substitution is not hindered.

Further, the upper wall 91 of the buffer tank 90 supports the ink cartridge 50 from below, the buffer tank 90 serves as the support member of the ink cartridge 50. Accordingly, as compared to a case where a support member is disposed other than the upper wall 91, this configuration can suppress increasing the size of the device that supplies ink to the recording unit 24, which includes the ink cartridge 50, the sub tank 100, and the buffer tank 90.

In the ink supplying device 15 according to the embodiment, the liquid flow passage 103 has the vertical portion 133 and the horizontal portion 134, and the gas flow passage 104 has the vertical portion 143 and the horizontal portion 144. The extending direction of the liquid flow passage 103 is not limited to the above embodiment, and the liquid flow passage 103 may have at least one of the vertical portion 133 and the horizontal portion 134. Similarly, the extending direction of the gas flow passage 104 is not limited to the above embodiment, and the gas flow passage 104 may have at least one of the vertical portion 143 and the horizontal portion 144.

According to the above embodiment, the horizontal portion 134 and the horizontal portion 144 of the liquid flow passage 103 and the gas flow passage 104 are both formed in the single member, joint 102. Alternatively, the ink supplying device 15 may have two joints such that one of the joints may be formed with at least part of the liquid flow passage 103 and the other joint may be formed with at least part of the gas flow passage 104.

According to the above embodiment, the atmospheric communication passage 147 extends upward from the buffer chamber 97, and alternatively, the atmospheric communication passage 147 may extend in the front-rear direction 8 or left-right direction 9 and may be bent to extend upward.

According to the above embodiment, communication flow passage 145 extends in the up-down direction 7. Alternatively, communication flow passage 145 may extend in the front-rear direction 8 or left-right direction 9, as long as the communication flow passage 145 is in communication with the buffer chamber 97.

According to the above embodiment, at least part of the first storage chamber 53 and at least part of the buffer chamber 97 are arranged in a line extending in the front-rear direction 8. Alternatively, at least part of the first storage chamber 53 and at least part of the buffer chamber 97 may be individually arranged in different lines extending in the front-rear direction 8.

According to the above embodiment, the protruding portion 65, the joint 102, and the atmospheric communication portion 70 are arranged in a line extending in the front-rear direction 8. Alternatively, the protruding portion 65, the joint 102, and the atmospheric communication portion 70 may be individually arranged in different lines extending in the front-rear direction 8.

What is claimed is:
1. A liquid storing device comprising:
a first chamber configured to store liquid;
a second chamber configured to store liquid;
a liquid passage, through which the first chamber is in communication with the second chamber, the liquid passage having a first end and a second end opposite to the first end;
a gas passage, through which the first chamber is in communication with the second chamber, the gas passage having a first end and a second end opposite to the first end; and
an air communication passage allowing the second chamber to communicate with an outside of the liquid storing device,
at least part of the second chamber being disposed below the first chamber,
the second chamber having a wide-width portion and a narrow-width portion, the wide-width portion being defined by a pair of opposite walls which are apart from each other in a first direction, the first direction being parallel with a horizontal direction, the narrow-width portion being defined by another pair of opposite walls which are apart from each other in the first direction, a distance between the pair of opposite walls defining the wide-width portion being greater than a distance between the pair of opposite walls defining the narrow-width portion,
one end of the air communication passage being formed with an opening, through which the air communication passage is in communication with the wide-width portion of the second chamber, the first end of the liquid passage being formed with a first opening, through which the liquid passage is in communication with the narrow-width portion of the second chamber, the first end of the gas passage being formed with a first opening, through which the gas passage is in communication with the second chamber, at least part of the first opening of the gas passage being positioned in the narrow-width portion of the second chamber, the first opening of the gas passage being opened over an entire width of the narrow-width portion of the second chamber in the first direction, the first end of the gas passage being disposed between the one end of the air communication passage and the first end of the liquid passage in a second direction that is parallel to the horizontal direction and that is orthogonal to the first direction.

2. The liquid storing device according to claim 1, further comprising a first communication passage, through which the first chamber is in communication with the second chamber, the liquid passage and the gas passage being disposed within the first communication passage.

3. The liquid storing device according to claim 2, wherein the first communication passage includes a wall separating the liquid passage and the gas passage from each other.

4. The liquid storing device according to claim 1, wherein the first opening of the liquid passage is opened over the entire width of the narrow-width portion in the first direction.

5. The liquid storing device according to claim 1, further comprising a valve configured to close both of the liquid passage and the gas passage.

6. The liquid storing device according to claim 5, wherein the valve includes a single valve configured to close both of the liquid passage and the gas passage.

7. The liquid storing device according to claim 5, wherein the valve is disposed at the second end of the liquid passage and the second end of the gas passage.

8. The liquid storing device according to claim 1,
wherein the second end of the gas passage is formed with a second opening, through which the gas passage is in communication with the first chamber,
wherein the second end of the liquid passage is formed with a second opening, through which the liquid passage is in communication with the first chamber, and
wherein the second opening of the gas passage is disposed above the second opening of the liquid passage.

9. An image recording apparatus comprising:
a liquid storing device; and
a recording device,
the liquid storing device comprising:
a first chamber configured to store liquid;
a second chamber configured to store liquid;
a liquid passage, through which the first chamber is in communication with the second chamber, the liquid passage having a first end and a second end opposite to the first end;
a gas passage, through which the first chamber is in communication with the second chamber, the gas passage having a first end and a second end opposite to the first end; and
an air communication passage allowing the second chamber to communicate with an outside of the image recording apparatus,
at least part of the second chamber being disposed below the first chamber, the second chamber having a wide-width portion and a narrow-width portion, the wide-width portion being defined by a pair of opposite walls which are apart from each other in a first direction, the first direction being parallel with a horizontal direction, the narrow-width portion being defined by another pair of opposite walls which are apart from each other in the first direction, a distance between the pair of opposite walls defining the wide-width portion being greater than a distance between the pair of opposite walls defining the narrow-width portion, one end of the air communication passage being formed with an opening, through which the air communication passage is in communication with the wide-width portion of the second chamber, the first end of the liquid passage being formed with a first opening, through which the liquid passage is in communication with the narrow-width portion of the second chamber, the first end of the gas passage being formed with a first opening, through which the gas passage is in communication with the second chamber, at least part of the first opening of the gas passage being positioned in the narrow-width portion of the second chamber, the first opening of the gas passage being opened over an entire width of the narrow-width portion of the second chamber in the first direction, the first end of the gas passage being disposed between the one end of the air communication passage and the first end of the liquid passage in a second direction that is parallel to the horizontal direction and that is orthogonal to the first direction, and the recording device being configured to eject liquid supplied from the second chamber of the liquid storing device.

10. The image recording apparatus according to claim 9, further comprising a first communication passage, through which the first chamber is in communication with the second chamber, the liquid passage and the gas passage being disposed within the first communication passage.

11. The image recording apparatus according to claim 10, wherein the first communication passage includes a wall separating the liquid passage and the gas passage from each other.

12. The image recording apparatus according to claim 9, wherein the first opening of the liquid passage is opened over the entire width of the narrow-width portion in the first direction.

13. The image recording apparatus according to claim 9, further comprising a valve configured to close both of the liquid passage and the gas passage.

14. The image recording apparatus according to claim 13, wherein the valve includes a single valve configured to close both of the liquid passage and the gas passage.

15. The image recording apparatus according to claim 13, wherein the valve is disposed at the second end of the liquid passage and the second end of the gas passage.

16. The image recording apparatus according to claim 9,
wherein the second end of the gas passage is formed with a second opening, through which the gas passage is in communication with the first chamber,
wherein the second end of the liquid passage is formed with a second opening, through which the liquid passage is in communication with the first chamber, and
wherein the second opening of the gas passage is disposed above the second opening of the liquid passage.

* * * * *